(12) United States Patent
Xu et al.

(10) Patent No.: US 11,811,529 B2
(45) Date of Patent: Nov. 7, 2023

(54) RATE-MATCHING, PUNCTURING, AND POWER SCALING UPLINK COMMUNICATIONS IN FULL DUPLEX MODE

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/323,206

(22) Filed: May 18, 2021

(65) Prior Publication Data
US 2021/0409151 A1    Dec. 30, 2021

Related U.S. Application Data

(60) Provisional application No. 63/043,551, filed on Jun. 24, 2020.

(51) Int. Cl.
*H04L 5/14*    (2006.01)
*H04L 1/00*    (2006.01)
(Continued)

(52) U.S. Cl.
CPC .......... *H04L 1/0068* (2013.01); *H04L 1/0003* (2013.01); *H04L 5/14* (2013.01); *H04W 72/0453* (2013.01); *H04W 72/1263* (2013.01)

(58) Field of Classification Search
CPC ....... H04L 1/0068; H04L 1/0003; H04L 5/14; H04L 1/0023; H04L 5/0044;
(Continued)

(56) References Cited

U.S. PATENT DOCUMENTS

2011/0275335 A1    11/2011 Luo et al.
2016/0254892 A1*   9/2016 Kim ...................... H04W 52/34
                                                    370/280
(Continued)

FOREIGN PATENT DOCUMENTS

WO    WO-2006138197 A2 * 12/2006 ............. H04B 7/185
WO    WO-2015034302 A1 *  3/2015 ............. H04L 5/001

OTHER PUBLICATIONS

International Search Report and Written Opinion—PCT/US2021/070576—ISA/EPO—dated Sep. 21, 2021.

*Primary Examiner* — Thai Nguyen
(74) *Attorney, Agent, or Firm* — QUALCOMM Incorporated

(57) ABSTRACT

Various aspects of the present disclosure generally relate to wireless communication. In some aspects, a user equipment (UE) may adjust a transmission parameter, associated with an uplink transmission from the UE, such that a phase for the uplink transmission is continuous across symbols of the uplink transmission. Adjusting the transmission parameter includes at least one of: rate-matching, puncturing, or power scaling one or more of the symbols within the uplink transmission, modifying at least one of a modulation and coding scheme or a power associated with a downlink transmission to the UE, or a combination thereof. The UE may further transmit, to a base station, the uplink transmission based at least in part on adjusting the transmission parameter. Numerous other aspects are provided.

29 Claims, 17 Drawing Sheets

800 ⟶

810 — Adjust a transmission parameter, associated with an uplink transmission from a UE, such that a phase for the uplink transmission is constant across symbols of the uplink transmission, the adjusting including at least one of: rate-matching, puncturing, or power scaling one of more of the symbols within the uplink transmission; modifying at least one of a modulation and coding scheme or a power associated with a downlink transmission to the UE; or a combination thereof 820 — Transmit the uplink transmission based at least in part on adjusting the transmission parameter

(51) Int. Cl.
*H04W 72/0453* (2023.01)
*H04W 72/1263* (2023.01)

(58) Field of Classification Search
CPC ............... H04L 1/0013; H04L 5/1469; H04W 72/0453; H04W 72/1263; H04W 52/262; H04W 52/146; H04W 52/247; H04W 52/18; H04W 74/002; H04W 74/0833
See application file for complete search history.

(56) References Cited

U.S. PATENT DOCUMENTS

| | | | |
|---|---|---|---|
| 2016/0330011 A1 | 11/2016 | Lee et al. | |
| 2018/0083824 A1* | 3/2018 | Yang | H04L 27/3405 |
| 2019/0090201 A1 | 3/2019 | Akkarakaran et al. | |
| 2020/0127803 A1* | 4/2020 | Luo | H04B 7/0854 |
| 2021/0105090 A1* | 4/2021 | Park | H04W 72/0446 |

\* cited by examiner

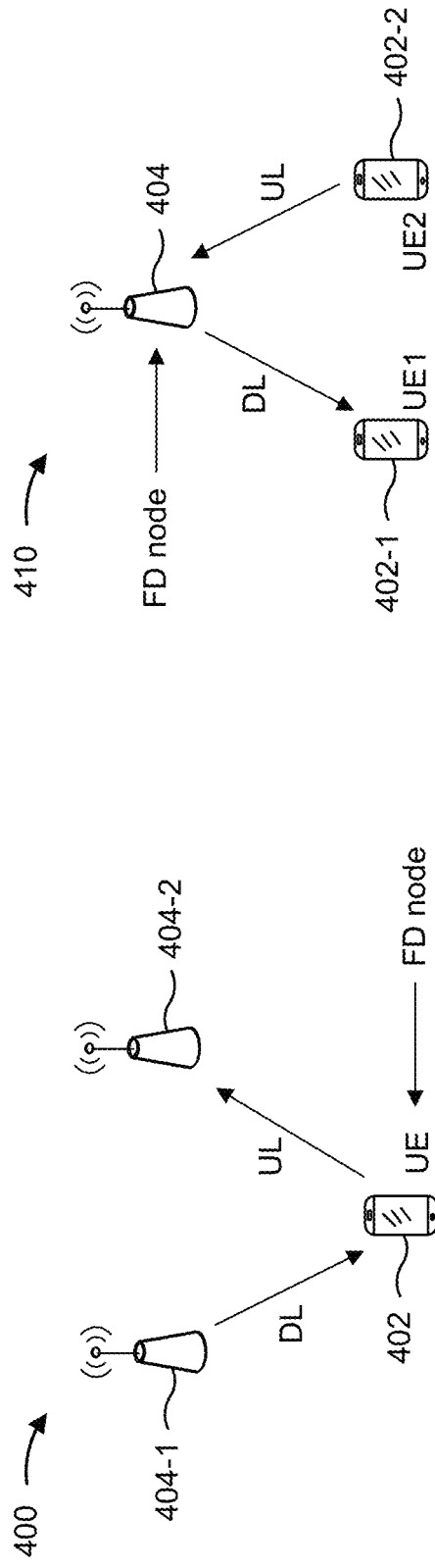
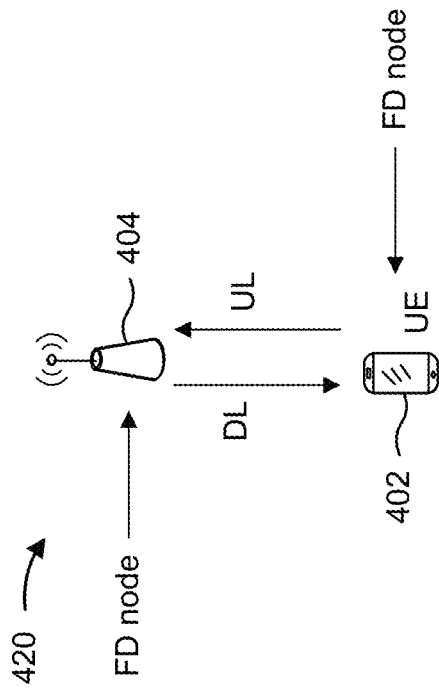
FIG. 4A
FIG. 4B
FIG. 4C

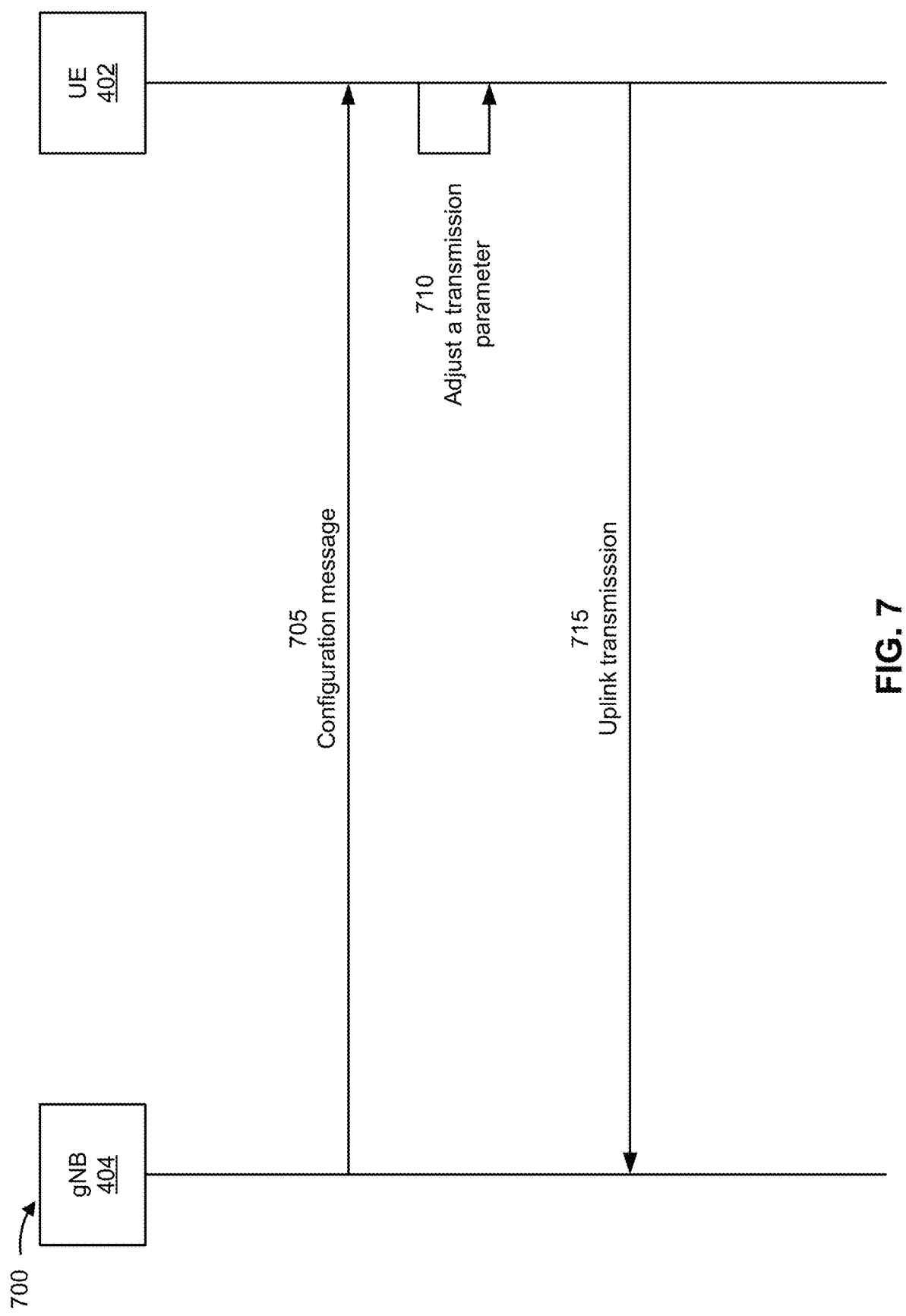

RATE-MATCHING, PUNCTURING, AND POWER SCALING UPLINK COMMUNICATIONS IN FULL DUPLEX MODE

CROSS-REFERENCE TO RELATED APPLICATION

This patent application claims priority to U.S. Provisional Patent Application No. 63/043,551, filed on Jun. 24, 2020, entitled "RATE-MATCHING, PUNCTURING, AND POWER SCALING UPLINK COMMUNICATIONS IN FULL DUPLEX MODE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for rate-matching, puncturing, and power scaling uplink communications in a full duplex mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes adjusting a transmission parameter, associated with an uplink transmission from the UE, such that a phase for the uplink transmission is continuous across symbols of the uplink transmission, wherein adjusting the transmission parameter includes at least one of: rate-matching, puncturing, or power scaling one or more of the symbols within the uplink transmission, modifying at least one of a modulation and coding scheme (MCS) or a power associated with a downlink transmission to the UE, or a combination thereof; and transmitting, to a base station, the uplink transmission based at least in part on adjusting the transmission parameter.

In some aspects, a method of wireless communication performed by a base station includes transmitting, to a UE, a message that configures the UE to adjust a transmission parameter associated with an uplink transmission from the UE, such that a phase of the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and receiving, from the UE, the uplink transmission based at least in part on transmitting the message.

In some aspects, a non-transitory computer-readable medium storing a set of instructions for wireless communication includes one or more instructions that, when executed by one or more processors of a UE, cause the UE to adjust a transmission parameter, associated with an uplink transmission from the UE, such that a phase for the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and transmit, to a base station, the uplink transmission based at least in part on adjusting the transmission parameter.

In some aspects, a non-transitory computer-readable medium storing a set of instructions for wireless communication includes one or more instructions that, when executed by one or more processors of a base station, cause the base station to transmit, to a UE, a message that configures the UE to adjust a transmission parameter associated with an uplink transmission from the UE, such that a phase of the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and receive, from the UE, the uplink transmission based at least in part on transmitting the message.

In some aspects, a UE for wireless communication includes a memory and one or more processors coupled to the memory, the memory and the one or more processors configured to adjust a transmission parameter, associated with an uplink transmission from the UE, such that a phase for the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and transmit, to a base station, the uplink transmission based at least in part on adjusting the transmission parameter.

In some aspects, a base station for wireless communication includes: a memory and one or more processors coupled to the memory, the memory and the one or more processors configured to transmit, to a UE, a message that configures the UE to adjust a transmission parameter associated with an uplink transmission from the UE, such that a phase of the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and receive, from the UE, the uplink transmission based at least in part on transmitting the message.

In some aspects, an apparatus for wireless communication includes means for adjusting a transmission parameter, associated with an uplink transmission from the apparatus, such that a phase for the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the apparatus, or a combination thereof; and means for transmitting, to a base station, the uplink transmission based at least in part on adjusting the transmission parameter.

In some aspects, an apparatus for wireless communication includes means for transmitting, to a UE, a message that configures the UE to adjust a transmission parameter associated with an uplink transmission from the UE, such that a phase of the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and means for receiving, from the UE, the uplink transmission based at least in part on transmitting the message.

In some aspects, a method of wireless communication performed by a UE includes receiving, from a base station, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and transmitting, to the base station, the uplink transmission based at least in part on the scheduling information.

In some aspects, a method of wireless communication performed by a base station includes transmitting, to a UE, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and receiving, from the UE, the uplink transmission based at least in part on the scheduling information.

In some aspects, a non-transitory computer-readable medium storing a set of instructions for wireless communication includes one or more instructions that, when executed by one or more processors of a UE, cause the UE to receive, from a base station, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and transmit, to the base station, the uplink transmission based at least in part on the scheduling information.

In some aspects, a non-transitory computer-readable medium storing a set of instructions for wireless communication includes one or more instructions that, when executed by one or more processors of a base station, cause the base station to transmit, to a UE, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and receive, from the UE, the uplink transmission based at least in part on the scheduling information.

In some aspects, a UE for wireless communication includes a memory and one or more processors coupled to the memory, the memory and the one or more processors configured to receive, from a base station, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and transmit, to the base station, the uplink transmission based at least in part on the scheduling information.

In some aspects, a base station for wireless communication includes a memory and one or more processors coupled to the memory, the memory and the one or more processors configured to transmit, to a UE, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and receive, from the UE, the uplink transmission based at least in part on the scheduling information.

In some aspects, an apparatus for wireless communication includes means for receiving, from a base station, scheduling information associated with an uplink transmission from the apparatus, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and means for transmitting, to the base station, the uplink transmission based at least in part on the scheduling information.

In some aspects, an apparatus for wireless communication includes means for transmitting, to a UE, scheduling information associated with an uplink transmission from the UE, wherein the scheduling information indicates that the uplink transmission is mapped to a first set of symbols that overlap, at least in part, with a downlink communication from the apparatus, and wherein the scheduling information further indicates that the uplink transmission is excluded from a second set of symbols that overlap, at least in part, with a reference signal from the apparatus; and means for receiving, from the UE, the uplink transmission based at least in part on the scheduling information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A, 4B, 4C, and 4D are diagrams illustrating examples of full duplex communication, in accordance with the present disclosure.

FIG. 7 is a diagram illustrating an example of rate-matching, puncturing, and power scaling uplink communications in a full duplex mode, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
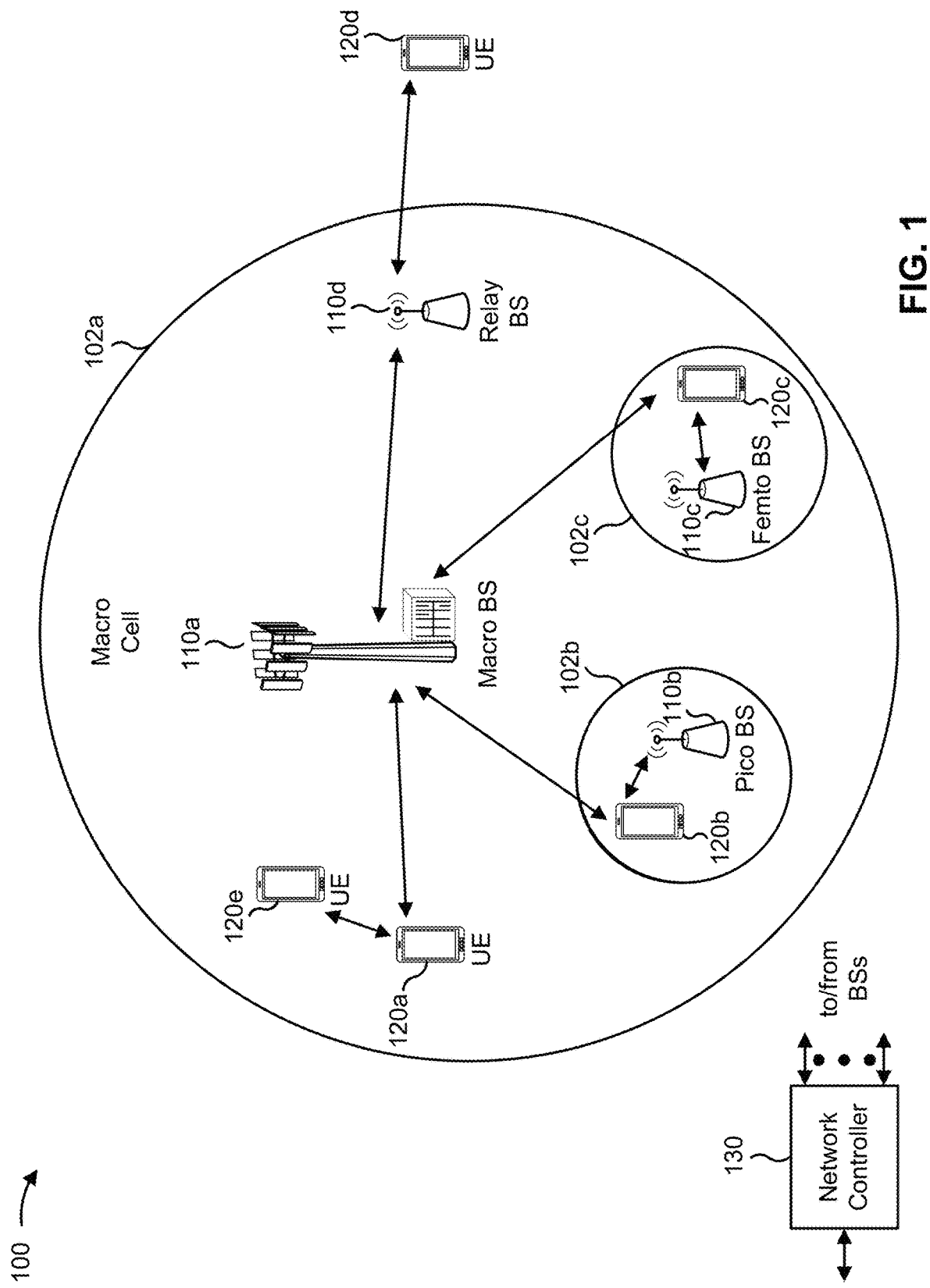
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
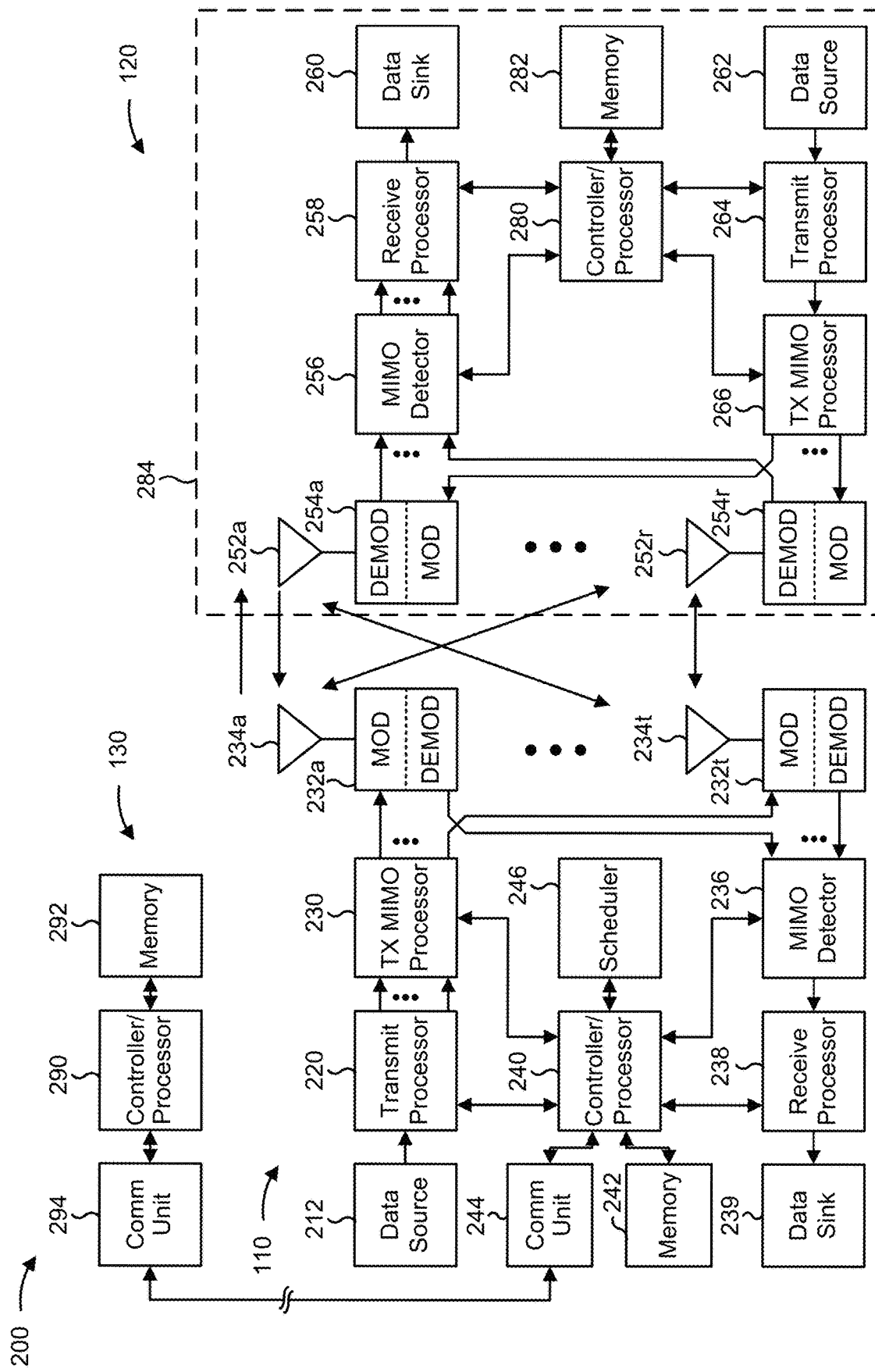
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5A-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5A-11).

Controller/processor 240 of base station 110, controller/processor 280 of UE 120, and/or any other component(s) of FIG. 2 may perform one or more techniques associated with controlling power for uplink communications in a full duplex mode, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a UE (e.g., the UE 120) may include means for adjusting a transmission parameter, associated with an uplink transmission from the UE, such that a phase for the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; and/or means for transmitting, to a base station, the uplink transmission based at least in part on adjusting the transmission parameter. The means for the UE to perform operations described herein may include, for example, one or more of controller/processor 280, transmit processor 264, TX MIMO processor 266, MOD 254, antenna 252, DEMOD 254, MIMO detector 256, receive processor 258, or memory 282.

In some aspects, a base station (e.g., the base station 110) may include means for transmitting, to a UE, a message that configures the UE to adjust a transmission parameter associated with an uplink transmission from the UE, such that a phase of the uplink transmission is continuous across symbols of the uplink transmission, wherein adjusting the transmission parameter includes at least one of: rate-matching, puncturing, or power scaling one or more of the symbols within the uplink transmission, modifying at least one of an MCS or a power associated with a downlink transmission to the UE, or a combination thereof; means for receiving, from the UE, the uplink transmission based at least in part on transmitting the message; and/or the like. The means for the base station to perform operations described herein may include, for example, one or more of antenna 234, DEMOD 232, MIMO detector 236, receive processor 238, controller/processor 240, transmit processor 220, TX MIMO processor 230, MOD 232, antenna 234, memory 242, or scheduler 246.

In some aspects, a UE (e.g., the UE 120) may include means for receiving, from a base station, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and/or means for transmitting, to the base station, the uplink transmission based at least in part on the scheduling information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110) may include means for transmitting, to a UE, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and/or means for receiving, from the UE, the uplink transmission based at least in part on the scheduling information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
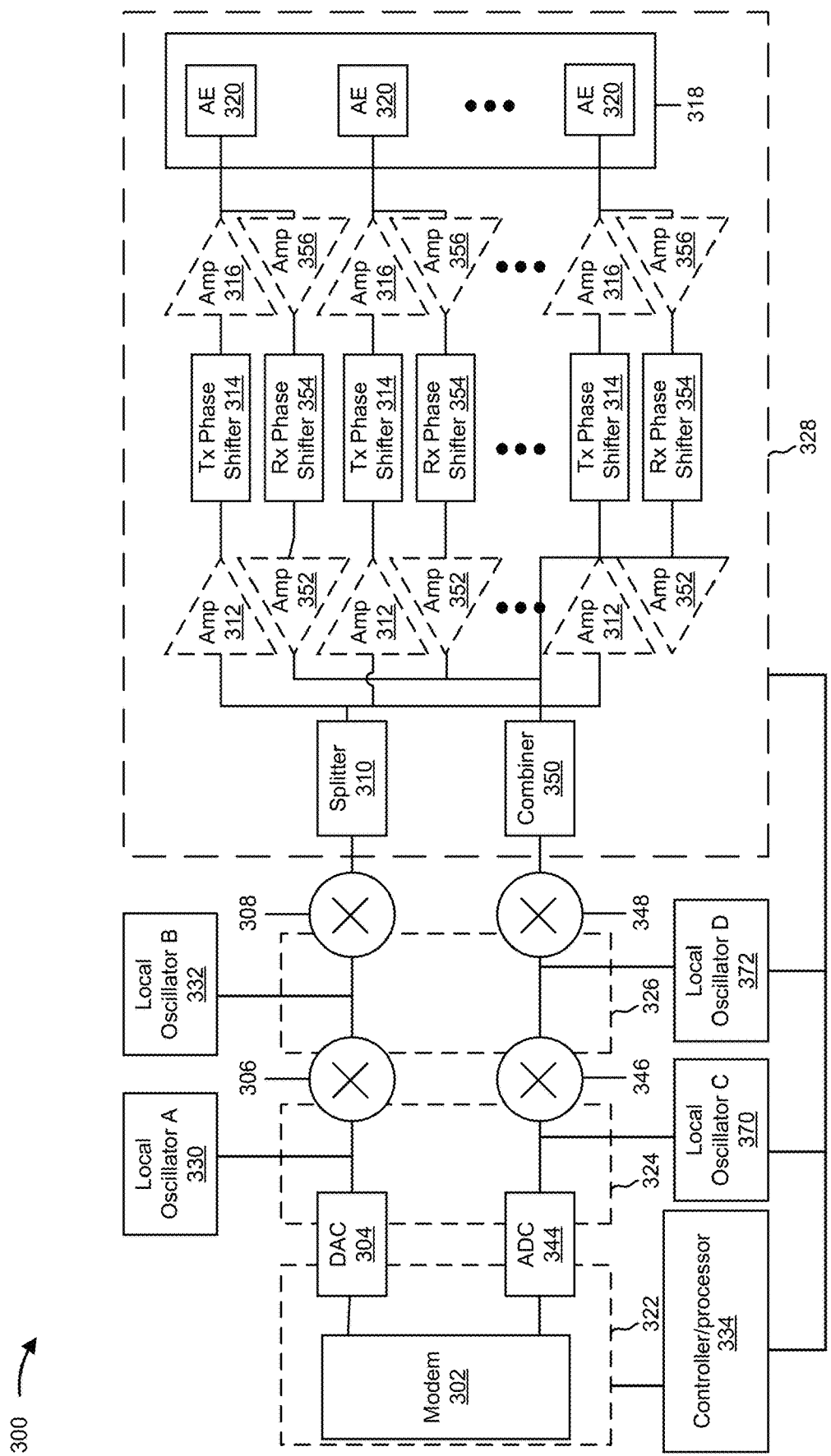
FIG. 3 is a diagram illustrating an example of a beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316, respectively, are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifier 312 and/or second amplifier 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

FIGS. 4A, 4B, and 4C are diagrams illustrating examples 400, 410, and 420, respectively, of full duplex communication. As shown in FIGS. 4A-4C, examples 400, 410, and 420 each include one or more UEs 402 in communication with one or more base stations (or TRPs) 404 in a wireless network that supports full duplex communication. However, it will be appreciated that the devices shown in FIGS. 4A-4C are provided by way of example only, and that the wireless network may support full duplex communication between other devices (e.g., between a mobile termination (MT) node and a control node (for example, a central unit (CU) or a distributed unit (DU)), between a child node and a parent node in an integrated access backhaul (IAB) network, and/or between a scheduled node and a scheduling node).

As shown in FIG. 4A, example 400 includes a UE 402 in communication with two base stations (or TRPs) 404-1 and 404-2. As shown in FIG. 4A, the UE 402 may transmit one or more uplink transmissions to base station 404-1 and may concurrently receive one or more downlink transmissions from base station 404-2. Accordingly, in the example 400 shown in FIG. 4A, full duplex communication is enabled for the UE 402, which may be operating as a full duplex node, but not for the base stations 404-1 and 404-2, which may be operating as half duplex nodes. Additionally, or alternatively, as shown in FIG. 4B, example 410 includes two UEs, UE1 402-1 and UE2 402-2, in communication with a base station (or TRP) 404. In this case, the base station 404 may transmit one or more downlink transmissions to the UE1 402-1 and may concurrently receive one or more uplink transmissions from the UE2 402-2. Accordingly, in the example 410 shown in FIG. 4B, full duplex communication is enabled for the base station 404, which may be operating as a full duplex node, but not for the UE1 402-1 and UE2 402-2, which may be operating as half duplex nodes. Additionally, or alternatively, as shown in FIG. 4C, example 420 includes a UE 402 in communication with a base station (or TRP) 404. In this case, the base station 404 may transmit, and the UE 402 may receive, one or more downlink transmissions concurrently with the UE 402 transmitting, and the base station 404 receiving, one or more uplink transmissions. Accordingly, in the example 420 shown in FIG. 4C, full duplex communication is enabled for both the UE 402 and the base station 404, each of which is operating as a full duplex node.

Utilizing full duplex communication provides reduced latency by allowing a full duplex node to transmit or receive a downlink signal in an uplink-only slot and/or to transmit or receive an uplink signal in a downlink-only slot. In addition, full duplex communication enhances spectral efficiency and/or network throughput (e.g., on a per cell and/or per UE basis), which results in more efficient resource utilization, by simultaneously utilizing time and frequency resources for uplink and downlink communication.

As indicated above, FIGS. 4A-4C are provided as examples. Other examples may differ from what is described with regard to FIGS. 4A-4C.

Figure 4D:
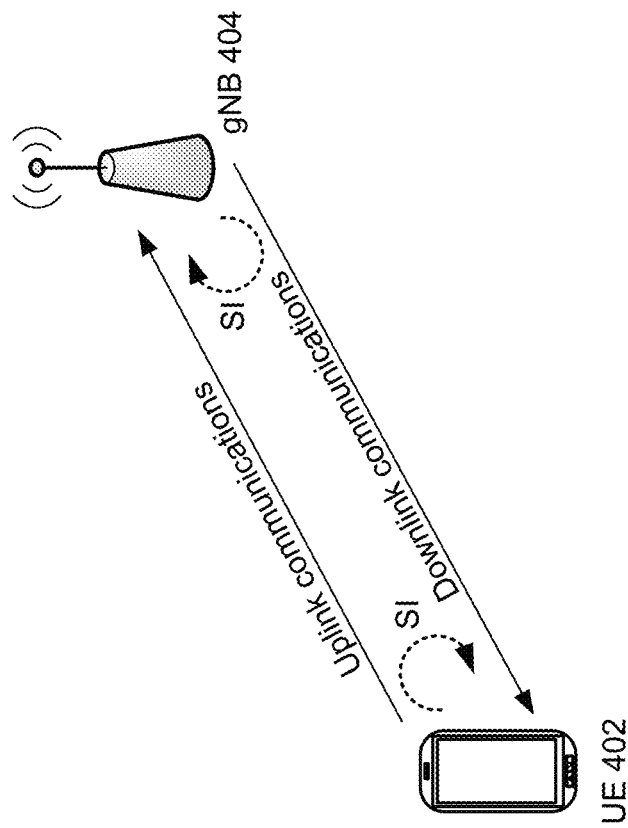

FIG. 4D is a diagram illustrating another example 430 of full duplex communication. As shown in FIG. 4D, example 430 includes a UE 402 in communication with a base station (e.g., gNB 404), or another type of TRP, in a wireless network that supports full duplex communication (e.g., wireless network 100 of FIG. 1). However, it will be appreciated that the devices shown in FIG. 4D are provided by way of example only, and that the wireless network may support full duplex communication between other devices (e.g., between an MT node and a control node, between a child node and a parent node in an IAB network, and/or between a scheduled node and a scheduling node).

As shown in FIG. 4D, the UE 402 may experience self-interference (SI) between uplink communications to the gNB 404 and downlink communications from the gNB 404. Similarly, the gNB 404 may experience SI between uplink communications from the UE 402 and downlink communications to the UE 402. In some aspects, the SI may be caused by overlaps in time and/or frequency between the uplink communications and downlink communications (e.g., as described below in connection with FIG. 5A). Additionally, or alternatively, the SI may be caused by little to no guard time and/or frequency between the uplink communications and downlink communications (e.g., as described below in connection with FIGS. 5B-5C).

Accordingly, full duplex communication may be performed by selecting suitable uplink and downlink beam pairs (e.g., transmit and receive beams that are associated with different antenna panels of a UE and/or associated with different antenna panels and/or TRPs of a base station) to reduce or minimize self-interference (especially clutter echo) via spatial isolation. Accordingly, the UE 402 and/or the gNB 404 may determine uplink and downlink beams, that are separated on respective antenna panels (and/or TRPs), to provide reliable full duplex communication by selecting beam pairs that minimize, or at least reduce, self-interference at the UE 402 and/or the gNB 404, respectively.

Measuring self-interference at a wireless node with full duplex capabilities may assist in determining uplink and downlink beam pairs that support full duplex communication. For example, the UE 402 (or an IAB child node, an MT unit, and/or another similar node) may obtain self-interference measurements to determine one or more candidate uplink transmit beams that can be paired with one or more candidate downlink receive beams. Additionally, or alternatively, the gNB 404 (or an IAB parent node, a CU, a DU, and/or another similar node) may obtain self-interference measurements to determine one or more candidate uplink receive beams that can be paired with one or more candidate downlink transmit beams. In general, to obtain the self-interference measurements, a wireless node with full duplex capabilities may transmit a signal from a first set of antennas (and/or TRPs) in one or more transmit beam directions, and the wireless node may concurrently measure a received signal (e.g., a reflected or leaked transmit signal) on a second set of antennas (and/or TRPs) in one or more receive beam directions, where the first set of antennas may be different from or the same as the second set of antennas.

In some situations, a UE may rate-match one or more symbols of an uplink transmission sent to a base station (e.g., corresponding to one or more symbols of a downlink transmission). Accordingly, the UE may estimate self-interference between the uplink transmission and the downlink transmission. Additionally, or alternatively, the UE may puncture one or more symbols of an uplink transmission such that at least a portion of the punctured symbols are not transmitted and thus do not interfere with overlapping, in time and/or in frequency, symbols of a downlink transmission. For example, the UE may measure non-self-interference based on the symbols of the downlink transmission corresponding to the punctured symbols of the uplink transmission. Additionally, or alternatively, the UE may receive a DMRS within the symbols of the downlink transmission corresponding to the punctured symbols of the uplink transmission. However, when only some symbols in the uplink transmission are rate-matched and/or punctured, the UE may cause phase discontinuity in the uplink transmission. Phase discontinuity causes reduced reliability and/or quality of the uplink transmission at the base station. Additionally, the UE may have to retransmit the uplink transmission when the base station is unable to decode the uplink transmission due to the phase discontinuity, and the retransmissions waste processing resources and power at both the UE and the base station as well as wasting network overhead.

Some aspects described herein relate to techniques and apparatuses that enable reducing, or even eliminating, phase discontinuity in uplink communications from a UE (e.g., UE 402 and/or UE 120) to a base station (e.g., gNB 404 and/or base station 110). In some aspects, techniques and apparatuses described herein may enable the UE 402 to adjust a transmit power for different symbols within uplink communications in order to reduce, or even eliminate, phase discontinuity. Additionally, or alternatively, techniques and apparatuses described herein may enable the UE 402 to maintain a continuous phase across gaps in symbols of uplink communications in order to reduce, or even eliminate, phase discontinuity. Accordingly, the UE 402 may improve the reliability and/or quality of full duplex communications. In addition, the UE 402 may conserve network overhead and processing resources by reducing a number of retransmissions of the uplink communications that may be required due to phase discontinuity. As an alternative, techniques and apparatuses described herein may enable the gNB 404 to schedule uplink communications excluding symbols that overlap, at least in part, with a reference signal from the gNB 404. Accordingly, the gNB 404 may improve the reliability and/or quality of full duplex communications. In addition, the gNB 404 may conserve network overhead and processing resources by reducing a number of retransmissions of the uplink communications that may be required due to phase discontinuity.

As indicated above, FIG. 4D is provided as an example. Other examples may differ from what is described with regard to FIG. 4D.

Figure 5A:
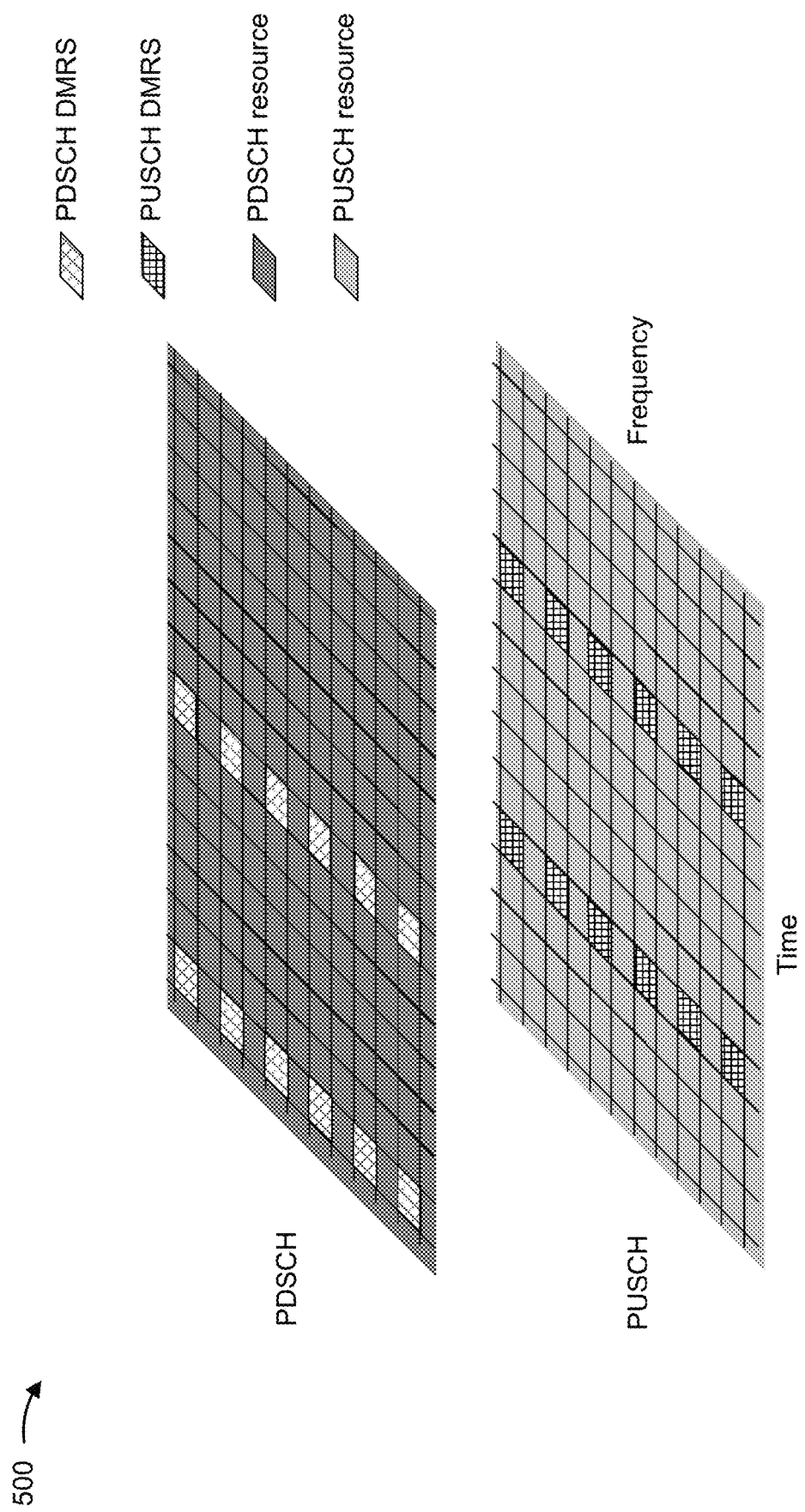
FIGS. 5A, 5B, and 5C are diagrams illustrating one or more examples of overlapping or neighboring symbols in full duplex communication, in accordance with the present disclosure.
Figure 5B:
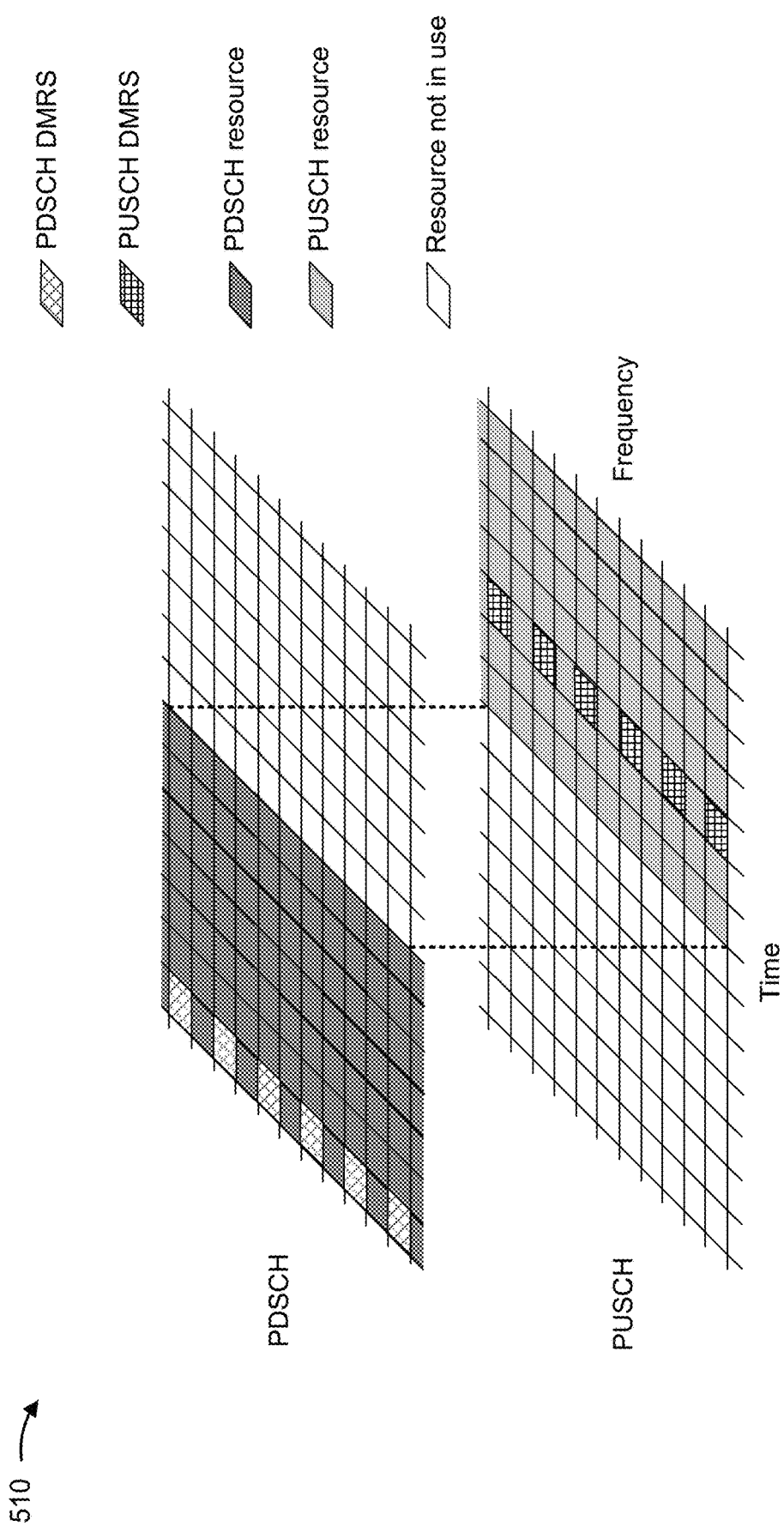
Figure 5C:
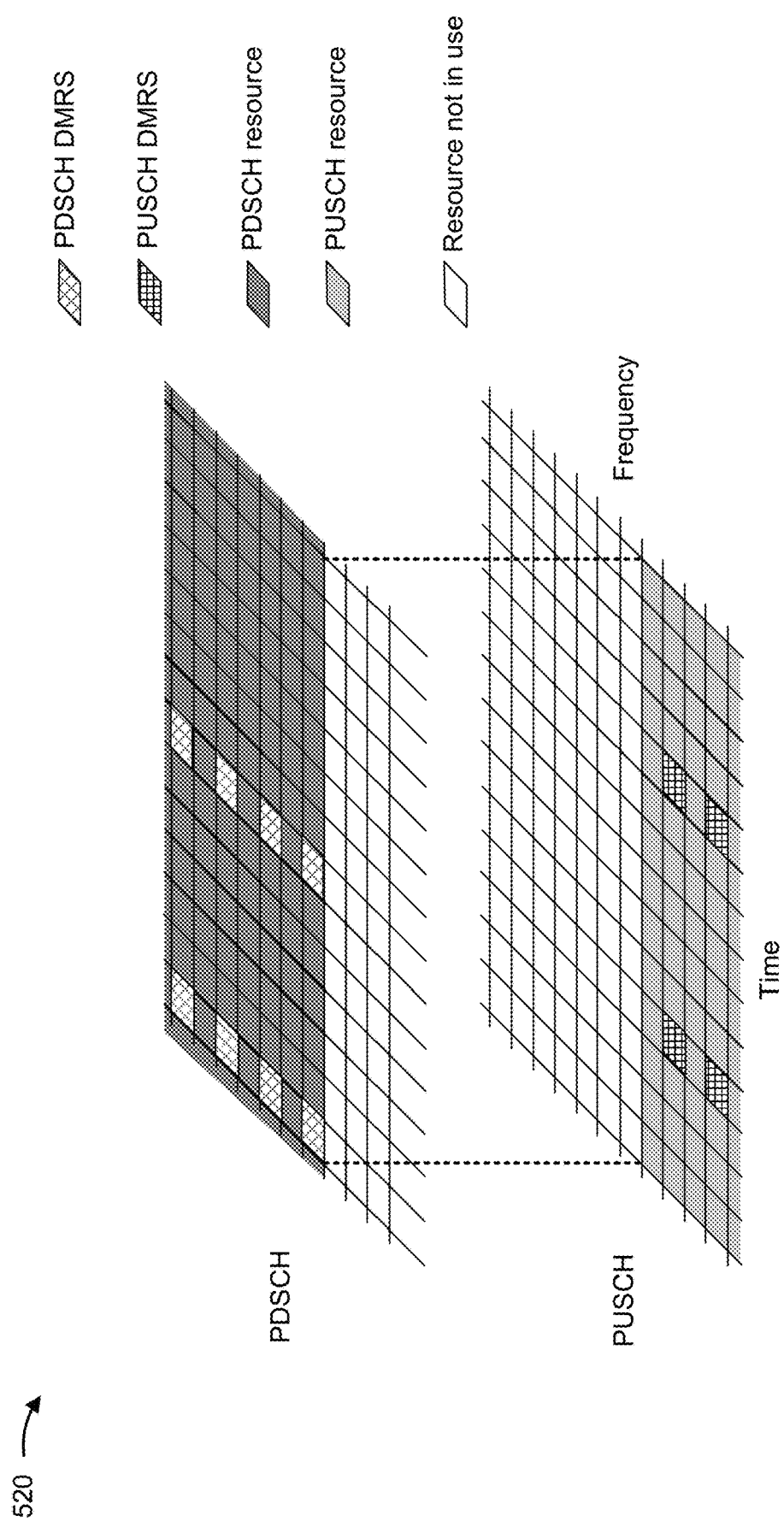

FIGS. 5A, 5B, and 5C are diagrams illustrating examples 500, 510, and 520, respectively, of overlapping or neighboring symbols in full duplex communication. Examples 500, 510, and 520 each include symbols depicted as areas within a time dimension and a frequency dimension. In FIGS. 5A-5C, uplink communications and downlink communications use the shaded symbols for respective uplink and downlink channels. Examples 500, 510, and 520 each show uplink symbols, including DMRS, for a physical uplink shared channel (PUSCH), and downlink symbols, including DMRS, for a physical downlink shared channel (PDSCH). Although the description below will focus on a PUSCH and a PDSCH, the description similarly applies to other channels for uplink communications and/or other channels for downlink communications, respectively.

Examples 500, 510, and 520 each may be associated with a full duplex mode of a UE (e.g., UE 402, UE 120, and/or another network node, such as an MT unit and/or a child IAB node) and/or a base station (e.g., gNB 404, base station 110, and/or another network node, such as a CU, a DU, and/or a parent IAB node). As shown in FIG. 5A, example 500 includes at least some downlink symbols and at least some uplink symbols that overlap in time and frequency. Accordingly, in example 500, the UE 402 may transmit and receive, in a same frequency bandwidth, concurrently. For example, the UE 402 may transmit to the gNB 404, and receive from the gNB 404, concurrently in one or more overlapping frequencies.

As shown in FIG. 5B, example 510 includes at least some uplink symbols that neighbor at least some downlink symbols in time. Although FIG. 5B shows no guard time between the neighboring symbols, the description similarly applies to a configuration in which at least some uplink symbols are separated from at least some downlink symbols in time by less than a threshold amount of time. Accordingly, in example 510, the UE 402 may transmit a first set of symbols and receive a second set of symbols, in a same frequency bandwidth, where the first set of symbols and the second set of symbols are separated in time with no guard time or with a guard time less than the threshold amount of time. For example, the UE 402 may transmit to the gNB 404 during a first time period, and receive from the gNB 404 during a second time period, in one or more overlapping frequencies.

As shown in FIG. 5C, example 520 includes at least some uplink symbols that neighbor at least some downlink symbols in frequency. Although FIG. 5C shows no guard band between the neighboring symbols, the description similarly applies to a configuration in which at least some uplink symbols are separated from at least some downlink symbols in frequency by less than a threshold amount of frequency. Accordingly, in example 520, the UE 402 may transmit a first set of symbols in a first frequency bandwidth and, concurrently, receive a second set of symbols in a second frequency bandwidth, where the first frequency bandwidth and the second frequency bandwidth are separated in frequency with no guard band or with a guard band less than the threshold amount of frequency. For example, the UE 402 may, concurrently, transmit to the gNB 404 in a first set of frequencies and receive from the gNB 404 in a second set of frequencies.

As indicated above, FIGS. 5A-5C are provided as examples. Other examples may differ from what is described with regard to FIGS. 5A-5C.

FIGS. 6A, 6B, 6C, and 6D are diagrams illustrating examples 600, 610, 620, and 630, respectively of transmit power for an uplink transmission. In each of examples 600, 610, and 620, the transmit power is constant across symbols. In example 630, the phase is continuous across symbols even though some symbols are gaps. Examples 600, 610, 620, and 630 each include symbols with rate-matching and/or puncturing in combination with symbols that lack rate-matching and puncturing. Examples 600, 610, 620, and 630 each show uplink symbols for a PUSCH. Although the description below will focus on a PUSCH, the description equally applies to other channels for uplink communications.

Figure 6A:
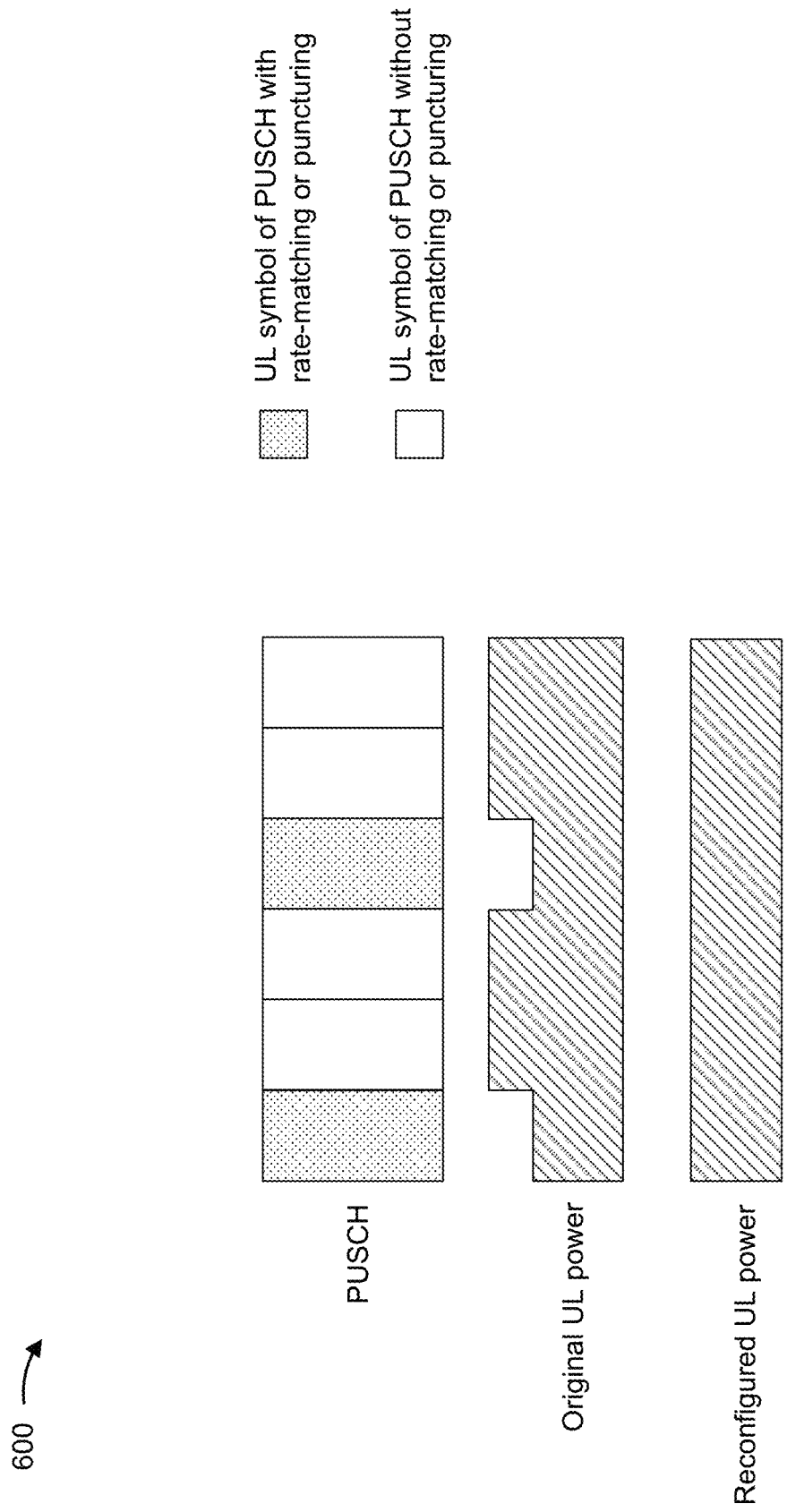
FIGS. 6A, 6B, 6C, and 6D are diagrams illustrating one or more examples of phase for an uplink transmission that is continuous across symbols, in accordance with the present disclosure.

Examples 600, 610, 620, and 630 may each be associated with a full duplex mode of a UE (e.g., UE 402, UE 120, and/or another network node, such as an MT unit and/or a child IAB node) and/or a base station (e.g., gNB 404, base station 110, and/or another network node, such as a CU, a DU, and/or a parent IAB node). As shown in FIG. 6A, example 600 includes two symbols in an uplink transmission that are rate-matched and/or punctured, and three symbols in the uplink transmission that are not rate-matched and not punctured. For example, the two symbols may correspond to symbols including the DMRS in a downlink transmission (such as a PDSCH message and/or another downlink message) that at least partially overlap, in time and/or in frequency, with the uplink transmission. Accordingly, in example 600, the uplink transmission may have a varying transmit power depending on which symbol the UE 402 is transmitting in, when the transmit power per resource element (RE) of the uplink transmission is constant across symbols of the entire uplink transmission. As used herein, "resource element" or "RE" may refer to a portion of a resource element group (REG), where a REG includes a plurality of REs, such as four consecutive REs, and each RE includes one symbol and one subcarrier A "subcarrier" may refer to a frequency based at least in part on a "carrier" frequency, and subcarriers may be aggregated to convey information wirelessly (e.g., using OFDM symbols and/or other RF symbols). As further shown in FIG. 6A, the UE 402 may rate-match, puncture, and/or power scale the other three symbols such that the transmit power for the uplink transmission is constant across symbols of the uplink transmission.

Figure 6B:
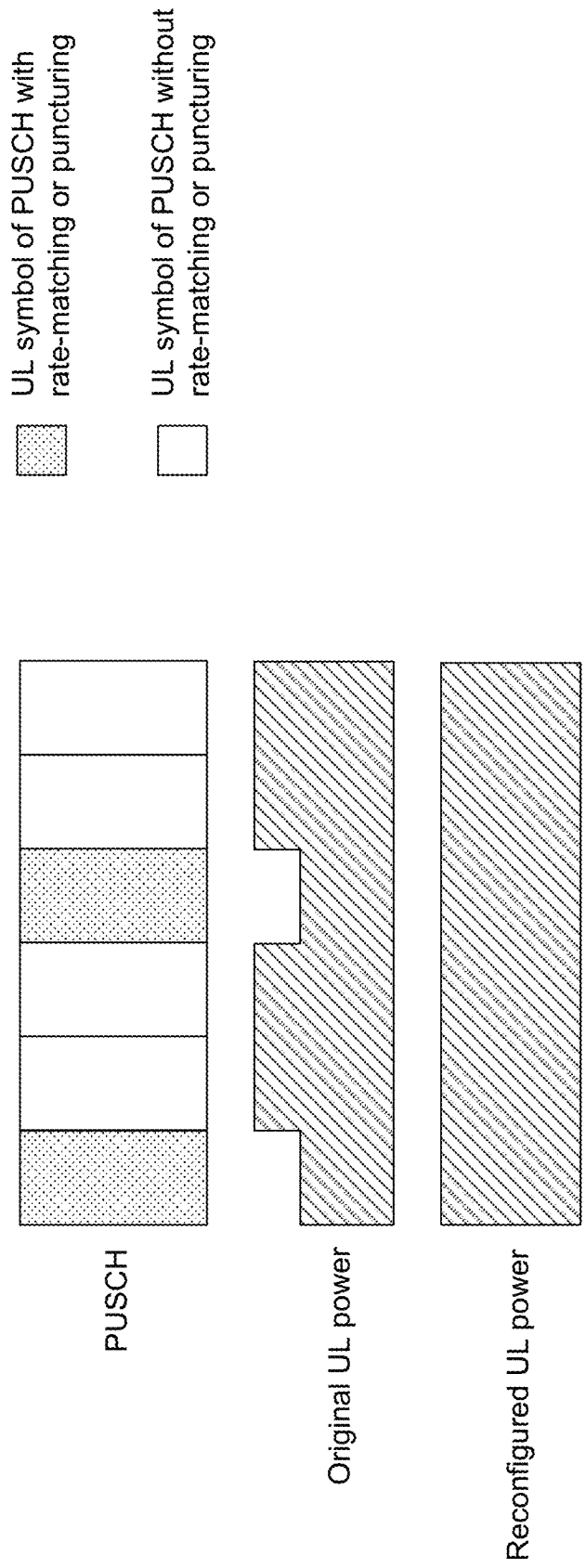

As shown in FIG. 6B, example 610 similarly includes two symbols in an uplink transmission that are rate-matched and/or punctured, and three symbols in the uplink transmission that are not rate-matched and not punctured. Accordingly, in example 610, the uplink transmission may have a varying transmit power depending on which symbol the UE 402 is transmitting in, when the transmit power per RE of the uplink transmission is constant across symbols of the entire uplink transmission. As further shown in FIG. 6B, the UE 402 may refrain from rate-matching and/or puncturing the two symbols such that the transmit power for the uplink transmission is constant across symbols of the uplink transmission. In example 610, the UE 402 may modify at least one of an MCS, a power associated with a downlink transmission to the UE 402, and/or another transmission parameter to compensate for refraining from rate-matching and/or puncturing the two symbols.

Figure 6C:
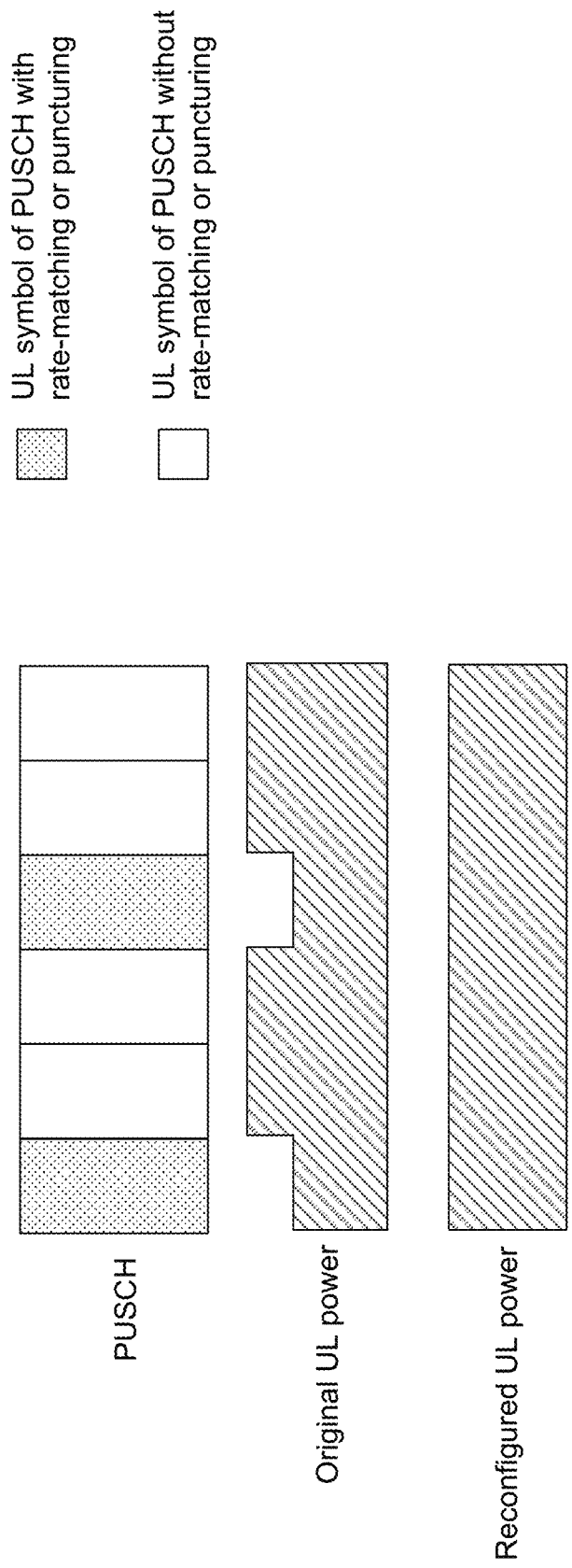

As shown in FIG. 6C, example 620 similarly includes two symbols in an uplink transmission that are rate-matched and/or punctured, and three symbols in the uplink transmission that are not rate-matched and not punctured. Accordingly, in example 620, the uplink transmission may have a varying transmit power depending on which symbol the UE 402 is transmitting in, when the transmit power per RE of the uplink transmission is constant across symbols of the entire uplink transmission. As further shown in FIG. 6C, the UE 402 may power scale the two symbols to increase transmit powers per resource element for the two symbols, and also rate-match, puncture, and/or power scale the other three symbols to decrease transmit powers for the other three symbols, such that the transmit power for the uplink transmission is constant across symbols of the uplink transmission.

Figure 6D:
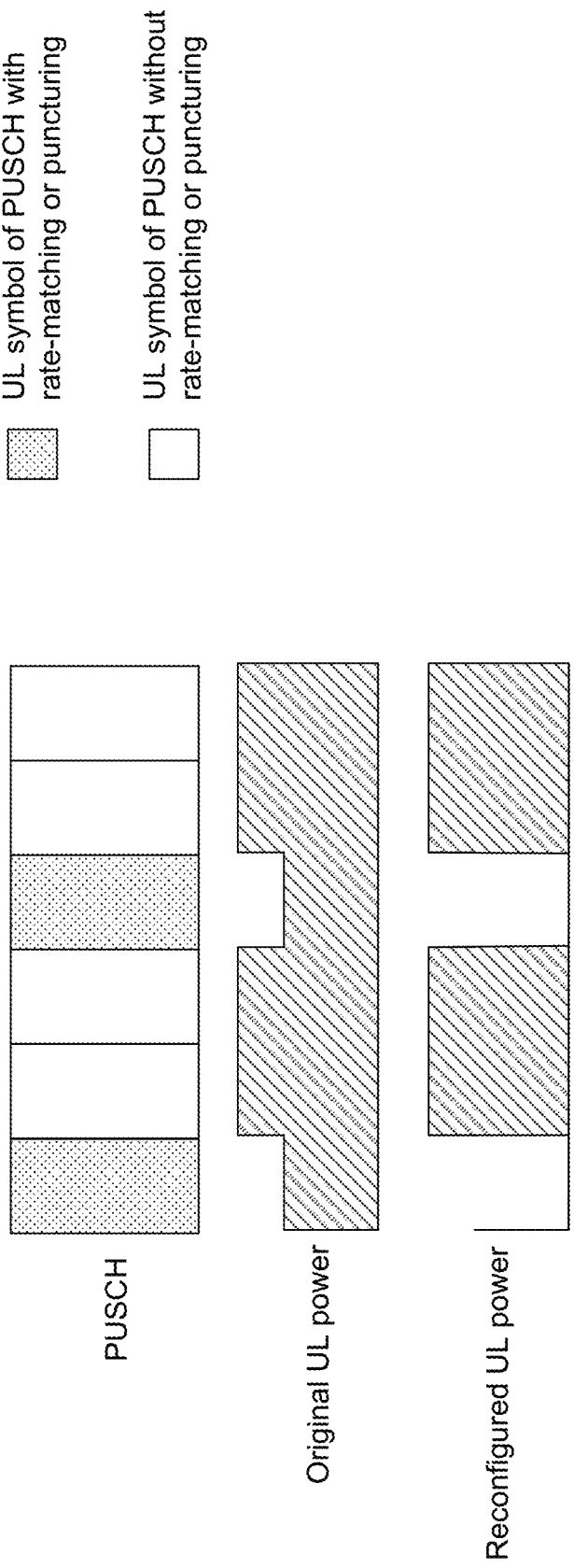

As shown in FIG. 6D, example 630 similarly includes two symbols, scheduled by the gNB 404, in an uplink transmission that are rate-matched and/or punctured, and three symbols, scheduled by the gNB 404, in the uplink transmission that are not rate-matched and not punctured. In example 630, the UE 402 does not transmit in the two symbols that are rate-matched (e.g., by not mapping the uplink transmission to the two symbols), such that the two symbols form gaps within the uplink transmission. Accordingly, in example 630, the uplink transmission may have a varying transmit power depending on in which symbol the UE 402 is transmitting when the transmit power per RE of the uplink transmission is constant across symbols of the entire uplink transmission. Accordingly, the UE 402 may modulate filler symbols within the two symbols, even though no signal is transmitted during the two symbols, such that the phase for the uplink transmission is continuous across symbols of the uplink transmission.

By ensuring that a transmit power for the uplink transmission is constant across symbols of the uplink transmission, the UE 402 may avoid phase discontinuity in the uplink transmission. Additionally, or alternatively, the UE 402 may use filler symbols to avoid phase discontinuity in the uplink transmission even when some symbols of the uplink transmission are gaps. As described above, the UE 402 may improve reliability and/or quality of the uplink transmission by avoiding phase discontinuity.

As indicated above, FIGS. 6A-6D are provided as one or more examples. Other examples may differ from what is described with regard to FIGS. 6A-6D.

FIG. 7 is a diagram illustrating an example 700 of rate-matching, puncturing, and power scaling uplink communications in a full duplex mode, in accordance with the present disclosure. As shown in FIG. 7, example 700 includes a UE (e.g., UE 402, UE 120, and/or another network node, such as an MT unit and/or a child IAB node) communicating with a node (gNB 404, base station 110, and/or another network node, such as a CU, a DU, and/or a parent IAB node). For example, the node may communicate with the UE 402 on a wireless network (e.g., wireless network 100 of FIG. 1). Although the description below will focus on the node being gNB 404, the description applies equally to another network node in communication with the UE 402.

In example 700, the UE 402 and/or the gNB 404 may operate in a full duplex mode (e.g., as described above in connection with FIGS. 4A-4D). As described above in connection with FIG. 5A, the UE 402, when in the full duplex mode, may transmit and receive, in a same frequency bandwidth, concurrently. Additionally, or alternatively, as described above in connection with FIG. 5B, the UE 402, when in the full duplex mode, may transmit a first set of symbols and receive a second set of symbols, in a same frequency bandwidth, where the first set of symbols and the second set of symbols are separated in time by less than a time threshold. Additionally, or alternatively, as described above in connection with FIG. 5C, the UE 402, when in the full duplex mode, may transmit a first set of symbols in a first frequency bandwidth and, concurrently, receive a second set of symbols in a second frequency bandwidth, where the first frequency bandwidth and the second frequency bandwidth are separated in frequency by less than a frequency threshold.

As shown in connection with reference number 705, the gNB 404 may transmit, and the UE 402 may receive, a message that triggers the UE 402 to adjust a transmission parameter associated with an uplink transmission from the UE 402. As used herein, the message may "trigger" by causing the UE 402 to perform an action (e.g., adjusting the transmission parameter) in response to receiving the message and/or in response to information included in, and/or indicated by, the message. Additionally, or alternatively, the message may "trigger" by providing the UE 402 with one or more parameters and/or other information that the UE 402 uses to perform an action (e.g., adjusting the transmission parameters).

In some aspects, the message may include a medium access control (MAC) control element (MAC-CE) and/or another control element. Additionally, or alternatively, the message may include downlink control information (DCI) and/or another signal including information associated with the uplink transmission. In some aspects, the UE 402 may adjust the transmission parameter associated with the uplink transmission in accordance with or otherwise based at least in part on the message.

In some aspects, the message may include a configuration for rate-matching and/or puncturing at least one symbol in the uplink transmission. For example, the gNB 404 may transmit the message to trigger the UE 402 to rate-match one or more symbols of the uplink transmission and/or to puncture one or more symbols of the uplink transmission (e.g., to allow for the gNB 404 to transmit downlink DMRS without self-interference, as described above).

In some aspects, the uplink transmission may be associated with a channel that includes at least one of a PUSCH, a physical uplink control channel (PUCCH), a random access channel (RACH), or a combination thereof. Additionally, or alternatively, the uplink transmission may be associated with a resource indicator. For example, the uplink transmission may be associated with a sounding reference signal (SRS) resource.

Additionally, or alternatively, the first uplink transmission may be associated with an ultra-reliable low-latency communication (URLLC) mode of the UE 402. For example, the first uplink transmission may include a URLLC or may otherwise be transmitted on a URLLC resource.

Additionally, or alternatively, the gNB 404 may transmit, and the UE 402 may receive, scheduling information. The scheduling information may indicate that the uplink transmission is mapped to a first set of symbols that overlap, at least in part, with a downlink communication (e.g., a PDSCH message and/or another downlink message) from the gNB 404. The scheduling information may further indicate that the uplink transmission is excluded from a second set of symbols that overlap, at least in part, with a reference signal (e.g., a DMRS, a channel state information reference signal (CSI-RS), and/or another reference signal) from the gNB 404.

In some aspects, the scheduling information may be included in a MAC-CE and/or another control element. Additionally, or alternatively, the scheduling information may be included in DCI and/or another signal including information associated with the uplink transmission. In some aspects, the UE 402 may schedule the uplink transmission in accordance with or otherwise based at least in part on the scheduling information.

As shown in connection with reference number 710, the UE 402 may adjust the transmission parameter associated with the uplink transmission. As described above in connection with FIGS. 6A-6C, the UE 402 may adjust the transmission parameter such that a transmit power for the uplink transmission is constant across symbols of the uplink transmission. Additionally, or alternatively, and as described in connection with FIG. 6D, the UE 402 may adjust the transmission parameter such that a phase for the uplink transmission is continuous across symbols of the uplink transmission As described above, the UE 402 may adjust the transmission parameter based at least in part on receiving the message from the gNB 404. Additionally, or alternatively, the UE 402 may adjust the transmission parameter based at least in part on a setting stored in a memory of the UE 402. For example, the UE 402 may be programmed (and/or otherwise preconfigured) according to one or more standards (e.g., 3GPP specifications and/or another standard). In some aspects, the UE 402 may adjust the transmission parameter based at least in part on a combination of receiving the message with a stored setting. For example, the message may trigger the UE 402 to use the stored setting to adjust the transmission parameter. Additionally, or alternatively, the message may include one or more coefficients and/or other variables that the UE 402 uses in combination with the stored setting to adjust the transmission parameter.

In some aspects, adjusting the transmission parameter may include at least one of: rate-matching, puncturing, or power scaling one or more of the symbols within the uplink transmission; modifying at least one of an MCS or a power associated with a downlink transmission to the UE 402; or a combination thereof. For example, as described above in connection with FIG. 6A, the UE 402 may adjust the transmission parameter by rate-matching or puncturing all symbols within the uplink transmission, such that the transmit power for the uplink transmission is constant across symbols of the uplink transmission. As an alternative, and as described above in connection with FIG. 6B, the UE 402 may not perform rate-matching or puncturing of any symbols within the uplink transmission. Accordingly, the UE 402 may modify at least one of an MCS, a power associated with a downlink transmission to the UE 402, and/or the like to compensate for refraining from rate-matching and/or puncturing any symbols within the uplink transmission.

Additionally, or alternatively, the UE 402 may adjust the transmission parameter by rate-matching at least one symbol within symbols of the uplink transmission that is scheduled by the gNB 404. As described in connection with FIG. 6D, the UE 402 may rate-match by not mapping the uplink transmission to the at least one symbol when the at least one symbol overlaps with a reference signal from the gNB 404.

Additionally, or alternatively, the UE 402 may adjust the transmission parameter by power scaling at least one symbol within the uplink transmission. For example, as described above in connection with FIG. 6C, the UE 402 may power scale the at least one symbol that is rate-matched or punctured within the uplink transmission by increasing a power associated with the at least one symbol. As shown in FIG. 6C, the UE 402 may increase the power in order to compensate for rate-matching and/or puncturing of the at least one symbol. Additionally, or alternatively, the UE 402 may power scale the at least one symbol that is not rate-matched or punctured within the uplink transmission by decreasing a power associated with the at least one symbol. As shown in FIG. 6C, the UE 402 may decrease the power of the at least one symbol in order to match other symbols that are rate-matched and/or punctured. In some aspects, as described above in connection with FIG. 6C, the UE 402 may increase a power associated with one or more symbols of the uplink transmission and also decrease a power associated with one or more other symbols of the uplink transmission, such that the transmit power for the uplink transmission is constant across symbols of the uplink transmission.

As shown in connection with reference number 715, the UE 402 may transmit, and the gNB 404 may receive, the uplink transmission based at least in part on adjusting the transmission parameter. In some aspects, as described above, the UE 402 may transmit the uplink transmission on a PUSCH, a PUCCH, a RACH, an SRS resource, and/or another uplink channel.

Additionally, or alternatively, the UE 402 may transmit, and the gNB 404 may receive, the uplink transmission based at least in part on the scheduling information from gNB 404. For example, the UE 402 may map the uplink transmission to a first set of symbols that overlap, at least in part, with a downlink communication from the gNB 404 but not to a second set of symbols that overlap, at least in part, with a reference signal from the gNB 404. In some aspects, as described above, the UE 402 may transmit the uplink transmission on a PUSCH, a PUCCH, a RACH, an SRS resource, and/or another uplink channel.

In some aspects, the uplink transmission may include at least one first symbol associated with the full duplex mode for the UE 402 and at least one second symbol associated with a half duplex mode for the UE 402. For example, the uplink transmission may include the at least one first symbol before the at least one second symbol. Additionally, or alternatively, the uplink transmission may include the at least one first symbol in one or more first frequencies and the at least one second symbol in one or more second frequencies. In some aspects, the at least one first symbol may overlap, in time and/or in frequency, with one or more symbols used for downlink communications from the gNB 404, and the at least one second symbol may not overlap with the one or more symbols used for downlink communications from the gNB 404.

In some aspects, the UE 402 may adjust the transmission parameter such that a transmit power associated with the at least one first symbol is equal to a transmit power associated with the at least one second symbol. For example, the UE 402 may use the same transmit power for the at least one first symbol as for the at least one second symbol, such that there is little to no phase discontinuity between symbols associated with the full duplex mode for the UE 402 and symbols associated with the half duplex mode for the UE 402. Additionally, or alternatively, the UE 402 may use one or more filler symbols such that a phase is continuous across the at least one first symbol and the at least one second symbol.

By transmitting the uplink transmission in accordance with techniques described in connection with FIG. 7 (and/or FIGS. 6A-6D), the UE 402 may reduce, or even eliminate, phase discontinuity, and thus improve the quality and/or reliability of the uplink transmission. Additionally, on account of the reduced or eliminated phase discontinuity, the UE 402 may reduce a possible need to retransmit the uplink transmission, thereby conserving network and processing resources.

As indicated above, FIG. 7 is provided as an example. Other examples may differ from what is described with respect to FIG. 7.

Figure 8:
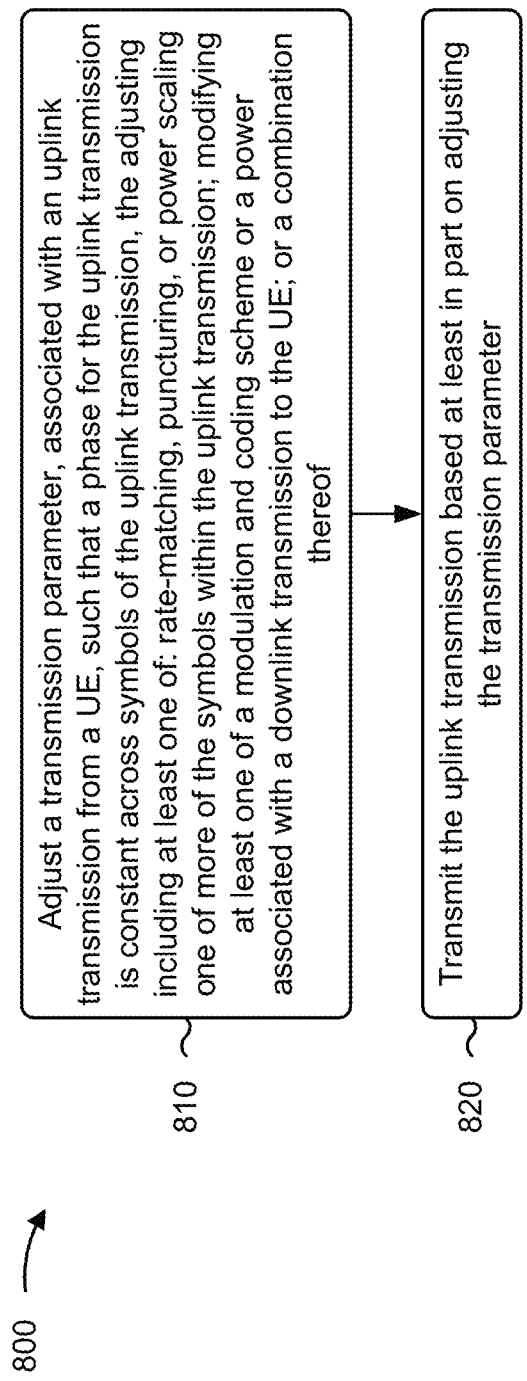
FIG. 8 is a diagram illustrating an example process performed by a UE, in accordance with the present disclosure.

FIG. 8 is a diagram illustrating an example process 800 performed, for example, by a UE, in accordance with the present disclosure. Example process 800 is an example where the UE (e.g., UE 402, UE 120, and/or another network node, such as an MT unit and/or a child IAB node) performs operations associated with rate-matching, puncturing, and power scaling uplink communications in a full duplex mode.

As shown in FIG. 8, in some aspects, process 800 may include adjusting a transmission parameter, associated with an uplink transmission from the UE, such that a phase for the uplink transmission is constant across symbols of the uplink transmission (block 810). For example, the UE (e.g., using one or more of antenna 252, transmit processor 264, TX MIMO processor 266, modulator 254, controller/processor 280, and/or memory 282) may adjust the transmission parameter, associated with the uplink transmission from the UE, such that the phase for the uplink transmission is constant across symbols of the uplink transmission, as described above. In some aspects, adjusting the transmission parameter includes at least one of: rate-matching, puncturing, or power scaling one or more of the symbols within the uplink transmission; modifying at least one of an MCS or a power associated with a downlink transmission to the UE; or a combination thereof.

As further shown in FIG. 8, in some aspects, process 800 may include transmitting, to a base station (e.g., gNB 404, base station 110, and/or another network node, such as a CU, a DU, and/or a parent IAB node), the uplink transmission based at least in part on adjusting the transmission parameter (block 820). For example, the UE (e.g., using one or more of antenna 252, transmit processor 264, TX MIMO processor 266, modulator 254, controller/processor 280, and/or memory 282) may transmit, to the base station, the uplink transmission based at least in part on adjusting the transmission parameter, as described above.

Process 800 may include additional aspects, such as any single aspect or any combination of aspects described below and/or in connection with one or more other processes described elsewhere herein.

In a first aspect, the uplink transmission includes a message on a PUSCH, a PUCCH, a RACH, or an SRS resource.

In a second aspect, alone or in combination with the first aspect, the transmission parameter is adjusted based at least in part on a setting stored in a memory of the UE.

In a third aspect, alone or in combination with one or more of the first and second aspects, the transmission parameter is adjusted based at least in part on receiving (e.g., using one or more of antenna 252, demodulator 254, MIMO detector 256, receive processor 258, transmit processor 264, controller/processor 280, and/or memory 282) a message from the base station.

In a fourth aspect, alone or in combination with one or more of the first through third aspects, the message includes a configuration for rate-matching or puncturing at least one symbol in the uplink transmission.

In a fifth aspect, alone or in combination with one or more of the first through fourth aspects, the transmission parameter is adjusted by rate-matching or puncturing all symbols within the uplink transmission.

In a sixth aspect, alone or in combination with one or more of the first through fifth aspects, rate-matching or puncturing is not performed for any symbols within the uplink transmission.

In a seventh aspect, alone or in combination with one or more of the first through sixth aspects, the transmission parameter is adjusted by rate-matching at least one symbol within symbols scheduled by the base station for the uplink transmission, and rate-matching the at least one symbol includes not mapping the uplink transmission to the at least one symbol when the at least one symbol overlaps with a reference signal from the base station.

In an eighth aspect, alone or in combination with one or more of the first through seventh aspects, the transmission parameter is adjusted by power scaling at least one symbol within the uplink transmission.

In a ninth aspect, alone or in combination with one or more of the first through eighth aspects, power scaling the at least one symbol within the uplink transmission includes increasing a power associated with the at least one symbol.

In a tenth aspect, alone or in combination with one or more of the first through ninth aspects, power scaling the at least one symbol within the uplink transmission includes decreasing a power associated with the at least one symbol.

In an eleventh aspect, alone or in combination with one or more of the first through tenth aspects, the uplink transmission is associated with a full duplex mode of the UE.

In a twelfth aspect, alone or in combination with one or more of the first through eleventh aspects, the UE, when in the full duplex mode, transmits and receives, in a same frequency bandwidth, concurrently.

In a thirteenth aspect, alone or in combination with one or more of the first through twelfth aspects, the UE, when in the full duplex mode, transmits a first set of symbols and receives a second set of symbols, in a same frequency bandwidth, wherein the first set of symbols and the second set of symbols are separated in time by less than a threshold.

In a fourteenth aspect, alone or in combination with one or more of the first through thirteenth aspects, the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

In a fifteenth aspect, alone or in combination with one or more of the first through fourteenth aspects, the uplink transmission includes at least one first symbol associated with a full duplex mode of the UE and at least one second symbol associated with a half duplex mode of the UE.

In a sixteenth aspect, alone or in combination with one or more of the first through fifteenth aspects, the transmission parameter is adjusted such that a transmit power associated with the at least one first symbol is equal to a transmit power associated with the at least one second symbol.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
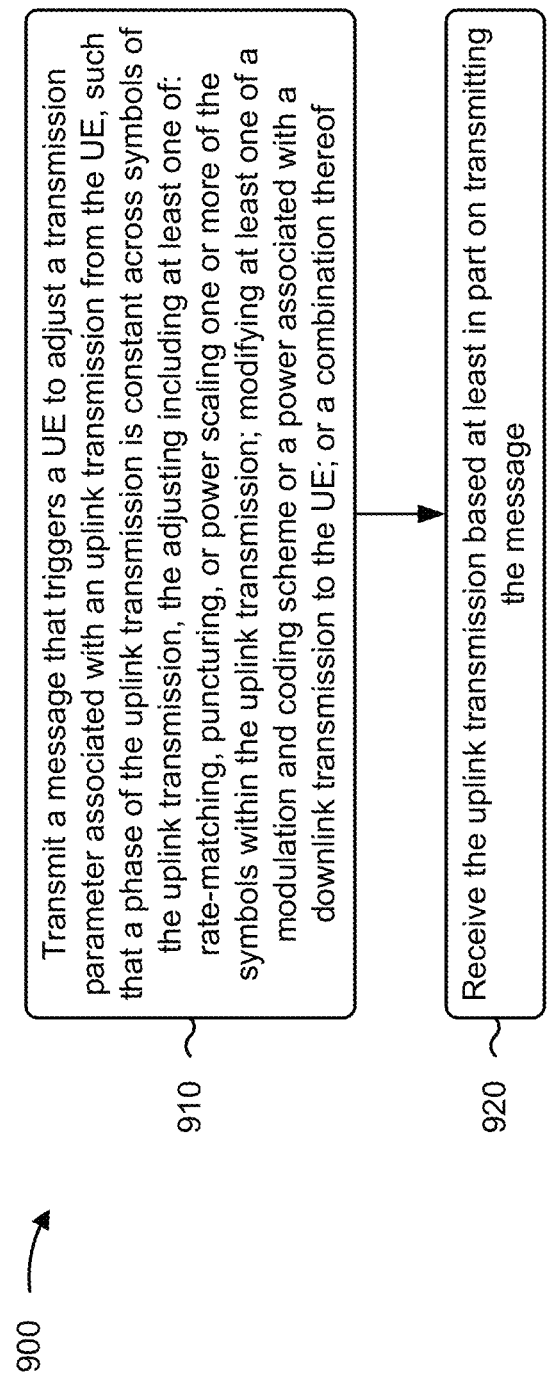
FIG. 9 is a diagram illustrating an example process performed by a base station, in accordance with the present disclosure.

FIG. 9 is a diagram illustrating an example process 900 performed, for example, by a base station, in accordance with the present disclosure. Example process 900 is an example where the base station (e.g., gNB 404, base station 110, and/or another network node, such as a CU, a DU, and/or a parent IAB node) performs operations associated with rate-matching, puncturing, and power scaling uplink communications in a full duplex mode.

As shown in FIG. 9, in some aspects, process 900 may include transmitting, to a UE (e.g., UE 402, UE 120, and/or another network node, such as an MT unit and/or a child IAB node), a message that triggers the UE to adjust a transmission parameter associated with an uplink transmission from the UE, such that a phase of the uplink transmission is constant across symbols of the uplink transmission (block 910). For example, the base station (e.g., using one or more of transmit processor 220, TX MIMO processor 230, modulator 232, antenna 234, controller/processor 240, memory 242, and/or scheduler 246) may transmit, to the UE, the message that triggers the UE to adjust the transmission parameter associated with the uplink transmission from the UE, such that the transmit power of the uplink transmission is constant across symbols of the uplink transmission, as described above. In some aspects, adjusting the transmission parameter includes at least one of: rate-matching, puncturing, or power scaling one or more of the symbols within the uplink transmission; modifying at least one of an MCS or a power associated with a downlink transmission to the UE; or a combination thereof.

As further shown in FIG. 9, in some aspects, process 900 may include receiving, from the UE, the uplink transmission based at least in part on transmitting the message (block 920). For example, the base station (e.g., using one or more of antenna 234, demodulator 232, MIMO detector 236, receive processor 238, controller/processor 240, memory 242, or scheduler 246) may receive, from the UE, the uplink transmission based at least in part on transmitting the message, as described above.

Process 900 may include additional aspects, such as any single aspect or any combination of aspects described below and/or in connection with one or more other processes described elsewhere herein.

In a first aspect, the uplink transmission includes a message on a PUSCH, a PUCCH, a RACH, or an SRS resource.

In a second aspect, alone or in combination with the first aspect, the message includes a configuration for rate-matching or puncturing at least one symbol in the uplink transmission.

In a third aspect, alone or in combination with one or more of the first and second aspects, all symbols within the uplink transmission are rate-matched or punctured.

In a fourth aspect, alone or in combination with one or more of the first through third aspects, no symbols within the uplink transmission are rate-matched or punctured.

In a fifth aspect, alone or in combination with one or more of the first through fourth aspects, at least one symbol within the uplink transmission is rate-matched such that the uplink transmission is not mapped to the at least one symbol when the at least one symbol overlaps with a reference signal from the base station.

In a sixth aspect, alone or in combination with one or more of the first through fifth aspects, at least one symbol within the uplink transmission is power scaled.

In a seventh aspect, alone or in combination with one or more of the first through sixth aspects, the at least one symbol within the uplink transmission is associated with a power that is increased.

In an eighth aspect, alone or in combination with one or more of the first through seventh aspects, the at least one symbol within the uplink transmission is associated with a power that is decreased.

In a ninth aspect, alone or in combination with one or more of the first through eighth aspects, the uplink transmission is associated with a full duplex mode of the UE.

In a tenth aspect, alone or in combination with one or more of the first through ninth aspects, the UE, when in the full duplex mode, transmits and receives, in a same frequency bandwidth, concurrently.

In an eleventh aspect, alone or in combination with one or more of the first through tenth aspects, the UE, when in the full duplex mode, transmits a first set of symbols and receives a second set of symbols, in a same frequency bandwidth, wherein the first set of symbols and the second set of symbols are separated in time by less than a threshold.

In a twelfth aspect, alone or in combination with one or more of the first through eleventh aspects, the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

In a thirteenth aspect, alone or in combination with one or more of the first through twelfth aspects, the uplink transmission includes at least one first symbol associated with a full duplex mode of the UE and at least one second symbol associated with a half duplex mode of the UE.

In a fourteenth aspect, alone or in combination with one or more of the first through thirteenth aspects, a transmit power associated with the at least one first symbol is equal to a transmit power associated with the at least one second symbol.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
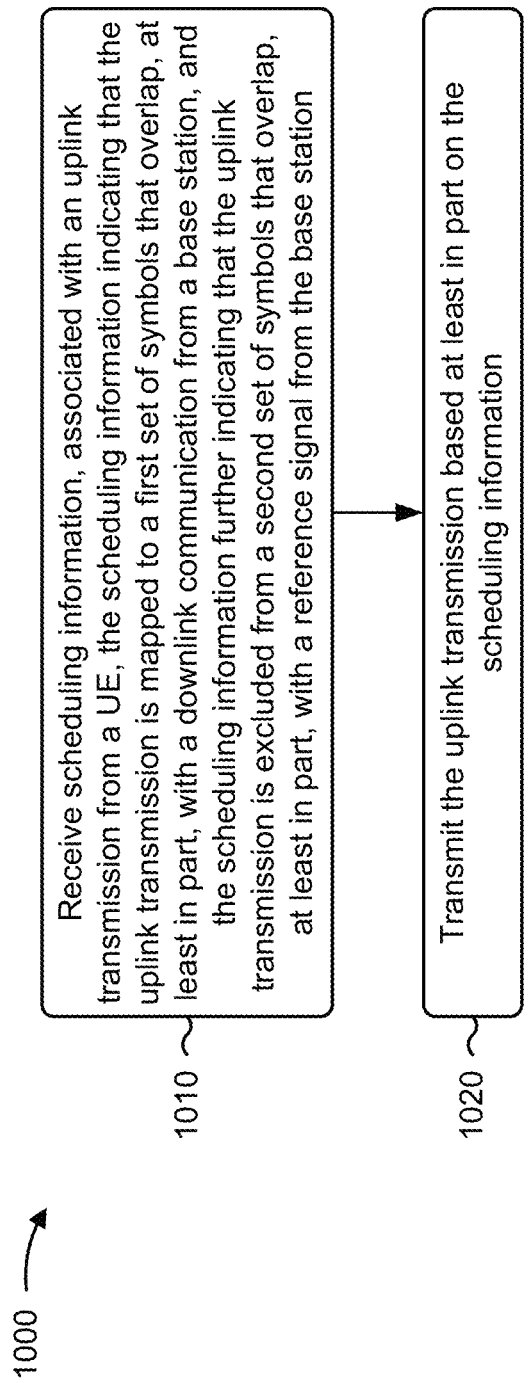
FIG. 10 is a diagram illustrating another example process performed by a UE, in accordance with the present disclosure.

FIG. 10 is a diagram illustrating an example process 1000 performed, for example, by a UE, in accordance with the present disclosure. Example process 1000 is an example where the UE (e.g., UE 402, UE 120, and/or another network node, such as an MT unit and/or a child IAB node) performs operations associated with rate-matching, puncturing, and power scaling uplink communications in a full duplex mode.

As shown in FIG. 10, in some aspects, process 1000 may include receiving, from a base station (e.g., gNB 404, base station 110, and/or another network node, such as a CU, a DU, and/or a parent IAB node), scheduling information associated with an uplink transmission from the UE (block 1010). For example, the UE (e.g., using one or more of antenna 252, demodulator 254, MIMO detector 256, receive processor 258, transmit processor 264, controller/processor 280, and/or memory 282) may receive, from the base station, the scheduling information associated with the uplink transmission from the UE, as described above. In some aspects, the scheduling information indicates that the uplink transmission is mapped to a first set of symbols that overlap, at least in part, with a downlink communication from the base station, and the scheduling information further indicates that the uplink transmission is excluded from a second set of symbols that overlap, at least in part, with a reference signal from the base station.

As further shown in FIG. 10, in some aspects, process 1000 may include transmitting, to the base station, the uplink transmission based at least in part on the scheduling information (block 1020). For example, the UE (e.g., using one or more of antenna 252, transmit processor 264, TX MIMO processor 266, modulator 254, controller/processor 280, and/or memory 282) may transmit, to the base station, the uplink transmission based at least in part on the scheduling information, as described above.

Process 1000 may include additional aspects, such as any single aspect or any combination of aspects described below and/or in connection with one or more other processes described elsewhere herein.

In a first aspect, the uplink transmission includes a message on a PUSCH, a PUCCH, a RACH, or an SRS resource.

In a second aspect, alone or in combination with the first aspect, the reference signal includes a DMRS associated with a PDSCH or a CSI-RS.

In a third aspect, alone or in combination with one or more of the first and second aspects, the uplink transmission is associated with a full duplex mode of the UE.

In a fourth aspect, alone or in combination with one or more of the first through third aspects, the UE, when in the full duplex mode, transmits and receives, in a same frequency bandwidth, concurrently.

In a fifth aspect, alone or in combination with one or more of the first through fourth aspects, the UE, when in the full duplex mode, transmits a first set of symbols and receives a second set of symbols, in a same frequency bandwidth, wherein the first set of symbols and the second set of symbols are separated in time by less than a threshold.

In a sixth aspect, alone or in combination with one or more of the first through fifth aspects, the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

In a seventh aspect, alone or in combination with one or more of the first through sixth aspects, the uplink transmission includes at least one first symbol associated with a full duplex mode of the UE and at least one second symbol associated with a half duplex mode of the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
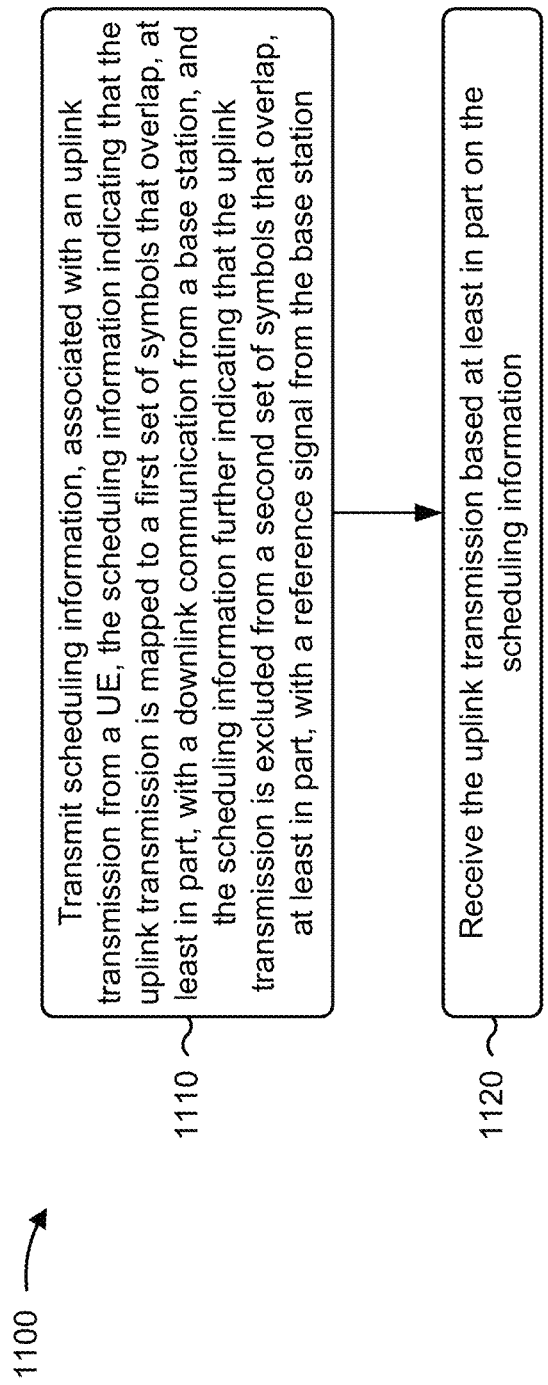
FIG. 11 is a diagram illustrating another example process performed by a base station, in accordance with the present disclosure.

FIG. 11 is a diagram illustrating an example process 1100 performed, for example, by a base station, in accordance with the present disclosure. Example process 1100 is an example where the base station (e.g., gNB 404, base station 110, and/or another network node, such as a CU, a DU, and/or a parent IAB node) performs operations associated with rate-matching, puncturing, and power scaling uplink communications in a full duplex mode.

As shown in FIG. 11, in some aspects, process 1100 may include transmitting, to a UE (e.g., UE 402, UE 120, and/or another network node, such as an MT unit and/or a child IAB node), scheduling information associated with an uplink transmission from the UE (block 1110). For example, the base station (e.g., using one or more of transmit processor 220, TX MIMO processor 230, modulator 232, antenna 234, controller/processor 240, memory 242, and/or scheduler 246) may transmit, to the UE, the scheduling information associated with the uplink transmission from the UE, as described above. In some aspects, the scheduling information indicates that the uplink transmission is mapped to a first set of symbols that overlap, at least in part, with a downlink communication from the base station, and the scheduling information further indicates that the uplink transmission is excluded from a second set of symbols that overlap, at least in part, with a reference signal from the base station.

As further shown in FIG. 11, in some aspects, process 1100 may include receiving, from the UE, the uplink transmission based at least in part on the scheduling information (block 1120). For example, the base station (e.g., using one or more of antenna 234, demodulator 232, MIMO detector 236, receive processor 238, controller/processor 240, memory 242, or scheduler 246) may receive, from the UE, the uplink transmission based at least in part on the scheduling information, as described above.

Process 1100 may include additional aspects, such as any single aspect or any combination of aspects described below and/or in connection with one or more other processes described elsewhere herein.

In a first aspect, the uplink transmission includes a message on a PUSCH, a PUCCH, a RACH, or an SRS resource.

In a second aspect, alone or in combination with the first aspect, the reference signal includes a DMRS associated with a PDSCH or a CSI-RS.

In a third aspect, alone or in combination with one or more of the first and second aspects, the uplink transmission is associated with a full duplex mode of the UE.

In a fourth aspect, alone or in combination with one or more of the first through third aspects, the UE, when in the full duplex mode, transmits and receives, in a same frequency bandwidth, concurrently.

In a fifth aspect, alone or in combination with one or more of the first through fourth aspects, the UE, when in the full duplex mode, transmits a first set of symbols and receives a second set of symbols, in a same frequency bandwidth, wherein the first set of symbols and the second set of symbols are separated in time by less than a threshold.

In a sixth aspect, alone or in combination with one or more of the first through fifth aspects, the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

In a seventh aspect, alone or in combination with one or more of the first through sixth aspects, the uplink transmission includes at least one first symbol associated with a full duplex mode of the UE and at least one second symbol associated with a half duplex mode of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: adjusting a transmission parameter, associated with an uplink transmission from the UE, such that a phase for the uplink transmission is constant across symbols of the uplink transmission, wherein adjusting the transmission parameter includes at least one of: rate-matching, puncturing, or power scaling one or more of the symbols within the uplink transmission, modifying at least one of a modulation and coding scheme (MCS) or a power associated with a downlink transmission to the UE, or a combination thereof; and transmitting, to a base station, the Uplink transmission based at least in part on adjusting the transmission parameter.

Aspect 2: The method of Aspect 1, wherein the uplink transmission includes a message on a physical uplink shared channel, a physical uplink control channel, a random access channel, or a sounding reference signal resource.

Aspect 3: The method of any of Aspects 1 through 2, wherein the transmission parameter is adjusted based at least in part on a setting stored in a memory of the UE.

Aspect 4: The method of any of Aspects 1 through 3, wherein the transmission parameter is adjusted based at least in part on receiving a message from the base station.

Aspect 5: The method of Aspect 4, wherein the message includes a configuration for rate-matching or puncturing at least one symbol in the uplink transmission.

Aspect 6: The method of any of Aspects 1 through 5, wherein the transmission parameter is adjusted by rate-matching or puncturing all symbols within the uplink transmission.

Aspect 7: The method of any of Aspects 1 through 5, wherein rate-matching or puncturing is not performed for any symbols within the uplink transmission.

Aspect 8: The method of any of Aspects 1 through 5, wherein the transmission parameter is adjusted by rate-matching at least one symbol within symbols scheduled by the base station for the uplink transmission, and wherein rate-matching the at least one symbol comprises not mapping the uplink transmission to the at least one symbol when the at least one symbol overlaps with a reference signal from the base station.

Aspect 9: The method of any of Aspects 1 through 8, wherein the transmission parameter is adjusted by power scaling at least one symbol within the uplink transmission.

Aspect 10: The method of Aspect 9, wherein power scaling the at least one symbol within the uplink transmission comprises increasing a power associated with the at least one symbol.

Aspect 11: The method of Aspect 9, wherein power scaling the at least one symbol within the uplink transmission comprises decreasing a power associated with the at least one symbol.

Aspect 12: The method of any of Aspects 1 through 11, wherein the uplink transmission is associated with a full duplex mode of the UE.

Aspect 13: The method of Aspect 12, wherein the UE, when in the full duplex mode, transmits and receives, in a same frequency bandwidth, concurrently.

Aspect 14: The method of Aspect 12, wherein the UE, when in the full duplex mode, transmits a first set of symbols and receives a second set of symbols, in a same frequency bandwidth, wherein the first set of symbols and the second set of symbols are separated in time by less than a threshold.

Aspect 15: The method of Aspect 12, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 16: The method of any of Aspects 1 through 15, wherein the uplink transmission includes at least one first symbol associated with a full duplex mode of the UE and at least one second symbol associated with a half duplex mode of the UE.

Aspect 17: The method of Aspect 16, wherein the transmission parameter is adjusted such that a transmit power associated with the at least one first symbol is equal to a transmit power associated with the at least one second symbol.

Aspect 18: A method of wireless communication performed by a base station, comprising: transmitting, to a user equipment (UE), a message that triggers the UE to adjust a transmission parameter associated with an uplink transmission from the UE, such that a phase of the uplink transmission is constant across symbols of the uplink transmission, wherein adjusting the transmission parameter includes at least one of: rate-matching, puncturing, or power scaling one or more of the symbols within the uplink transmission, modifying at least one of a modulation and coding scheme (MCS) or a power associated with a downlink transmission to the UE, or a combination thereof; and receiving, from the UE, the uplink transmission based at least in part on transmitting the message.

Aspect 19: The method of Aspect 18, wherein the uplink transmission includes a message on a physical uplink shared channel, a physical uplink control channel, a random access channel, or a sounding reference signal resource.

Aspect 20: The method of any of Aspects 18 through 19, wherein the message includes a configuration for rate-matching or puncturing at least one symbol in the uplink transmission.

Aspect 21: The method of any of Aspects 18 through 20, wherein all symbols within the uplink transmission are rate-matched or punctured.

Aspect 22: The method of any of Aspects 18 through 20, wherein no symbols within the uplink transmission are rate-matched or punctured.

Aspect 23: The method of any of Aspects 18 through 20, wherein at least one symbol within the uplink transmission is rate-matched such that the uplink transmission is not mapped to the at least one symbol when the at least one symbol overlaps with a reference signal from the base station.

Aspect 24: The method of any of Aspects 18 through 23, wherein at least one symbol within the uplink transmission is power scaled.

Aspect 25: The method of Aspect 24, wherein the at least one symbol within the uplink transmission is associated with a power that is increased.

Aspect 26: The method of Aspect 24, wherein the at least one symbol within the uplink transmission is associated with a power that is decreased.

Aspect 27: The method of any of Aspects 18 through 26, wherein the uplink transmission is associated with a full duplex mode of the UE.

Aspect 28: The method of Aspect 27, wherein the UE, when in the full duplex mode, transmits and receives, in a same frequency bandwidth, concurrently.

Aspect 29: The method of Aspect 27, wherein the UE, when in the full duplex mode, transmits a first set of symbols and receives a second set of symbols, in a same frequency bandwidth, wherein the first set of symbols and the second set of symbols are separated in time by less than a threshold.

Aspect 30: The method of Aspect 27, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 31: The method of any of Aspects 18 through 30, wherein the uplink transmission includes at least one first symbol associated with a full duplex mode of the UE and at least one second symbol associated with a half duplex mode of the UE.

Aspect 32: The method of Aspect 31, wherein a transmit power associated with the at least one first symbol is equal to a transmit power associated with the at least one second symbol.

Aspect 33: A method of wireless communication performed by a user equipment (UE), comprising: receiving, from a base station, scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and transmitting, to a base station, the uplink transmission based at least in part on the scheduling information.

Aspect 34: The method of Aspect 33, wherein the uplink transmission includes a message on a physical uplink shared channel, a physical uplink control channel, a random access channel, or a sounding reference signal resource.

Aspect 35: The method of any of Aspects 33 through 34, wherein the reference signal includes a demodulation reference signal associated with a physical downlink shared channel or a channel state information reference signal.

Aspect 36: The method of any of Aspects 33 through 35, wherein the uplink transmission is associated with a full duplex mode of the UE.

Aspect 37: The method of Aspect 36, wherein the UE, when in the full duplex mode, transmits and receives, in a same frequency bandwidth, concurrently.

Aspect 38: The method of Aspect 36, wherein the UE, when in the full duplex mode, transmits a first set of symbols and receives a second set of symbols, in a same frequency bandwidth, wherein the first set of symbols and the second set of symbols are separated in time by less than a threshold.

Aspect 39: The method of Aspect 36, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 40: The method of any of Aspects 33 through 39, wherein the uplink transmission includes at least one first symbol associated with a full duplex mode of the UE and at least one second symbol associated with a half duplex mode of the UE.

Aspect 41: A method of wireless communication performed by a base station, comprising: transmitting, to a user equipment (UE), scheduling information associated with an uplink transmission from the UE, wherein the scheduling information indicates that the uplink transmission is mapped to a first set of symbols that overlap, at least in part, with a downlink communication from the base station, and wherein the scheduling information further indicates that the uplink transmission is excluded from a second set of symbols that overlap, at least in part, with a reference signal from the base station; and receiving, from the UE, the uplink transmission based at least in part on the scheduling information.

Aspect 42: The method of Aspect 41, wherein the uplink transmission includes a message on a physical uplink shared channel, a physical uplink control channel, a random access channel, or a sounding reference signal resource.

Aspect 43: The method of any of Aspects 41 through 42, wherein the reference signal includes a demodulation reference signal associated with a physical downlink shared channel or a channel state information reference signal.

Aspect 44: The method of any of Aspects 41 through 43, wherein the uplink transmission is associated with a full duplex mode of the UE.

Aspect 45: The method of Aspect 44, wherein the UE, when in the full duplex mode, transmits and receives, in a same frequency bandwidth, concurrently.

Aspect 46: The method of Aspect 44, wherein the UE, when in the full duplex mode, transmits a first set of symbols and receives a second set of symbols, in a same frequency bandwidth, wherein the first set of symbols and the second set of symbols are separated in time by less than a threshold.

Aspect 47: The method of Aspect 44, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 48: The method of any of Aspects 41 through 47, wherein the uplink transmission includes at least one first symbol associated with a full duplex mode of the UE and at least one second symbol associated with a half duplex mode of the UE.

Aspect 49: An apparatus for wireless communication at a device, comprising a processor; memory coupled with the processor; and instructions stored in the memory and executable by the processor to cause the apparatus to perform the method of one or more Aspects of Aspects 1-17.

Aspect 50: A device for wireless communication, comprising a memory and one or more processors coupled to the memory, the memory and the one or more processors configured to perform the method of one or more Aspects of Aspects 1-17.

Aspect 51: An apparatus for wireless communication, comprising at least one means for performing the method of one or more Aspects of Aspects 1-17.

Aspect 52: A non-transitory computer-readable medium storing code for wireless communication, the code comprising instructions executable by a processor to perform the method of one or more Aspects of Aspects 1-17.

Aspect 53: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 54: An apparatus for wireless communication at a device, comprising a processor; memory coupled with the processor; and instructions stored in the memory and executable by the processor to cause the apparatus to perform the method of one or more Aspects of Aspects 18-32.

Aspect 55: A device for wireless communication, comprising a memory and one or more processors coupled to the memory, the memory and the one or more processors configured to perform the method of one or more Aspects of Aspects 18-32.

Aspect 56: An apparatus for wireless communication, comprising at least one means for performing the method of one or more Aspects of Aspects 18-32.

Aspect 57: A non-transitory computer-readable medium storing code for wireless communication, the code comprising instructions executable by a processor to perform the method of one or more Aspects of Aspects 18-32.

Aspect 58: A non-transitory computer-readable medium storing a set of instructions for wireless communication, the set of instructions comprising one or more instructions that, when executed by one or more processors of a device, cause the device to perform the method of one or more Aspects of Aspects 18-32.

Aspect 59: An apparatus for wireless communication at a device, comprising a processor; memory coupled with the processor; and instructions stored in the memory and executable by the processor to cause the apparatus to perform the method of one or more Aspects of Aspects 33-40.

Aspect 60: A device for wireless communication, comprising a memory and one or more processors coupled to the memory, the memory and the one or more processors configured to perform the method of one or more Aspects of Aspects 33-40.

Aspect 61: An apparatus for wireless communication, comprising at least one means for performing the method of one or more Aspects of Aspects 33-40.

Aspect 62: A non-transitory computer-readable medium storing code for wireless communication, the code comprising instructions executable by a processor to perform the method of one or more Aspects of Aspects 33-40.

Aspect 63: A non-transitory computer-readable medium storing a set of instructions for wireless communication, the set of instructions comprising one or more instructions that, when executed by one or more processors of a device, cause the device to perform the method of one or more Aspects of Aspects 33-40.

Aspect 64: An apparatus for wireless communication at a device, comprising a processor; memory coupled with the processor; and instructions stored in the memory and executable by the processor to cause the apparatus to perform the method of one or more Aspects of Aspects 41-48.

Aspect 65: A device for wireless communication, comprising a memory and one or more processors coupled to the memory, the memory and the one or more processors configured to perform the method of one or more Aspects of Aspects 41-48.

Aspect 66: An apparatus for wireless communication, comprising at least one means for performing the method of one or more Aspects of Aspects 41-48.

Aspect 67: A non-transitory computer-readable medium storing code for wireless communication, the code comprising instructions executable by a processor to perform the method of one or more Aspects of Aspects 41-48.

Aspect 68: A non-transitory computer-readable medium storing a set of instructions for wireless communication, the set of instructions comprising one or more instructions that, when executed by one or more processors of a device, cause the device to perform the method of one or more Aspects of Aspects 41-48.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the memory and the one or more processors configured to:
adjust a transmission parameter associated with an uplink transmission from the UE, wherein a phase for the uplink transmission is continuous across symbols of the uplink transmission, wherein adjusting the transmission parameter includes at least one of:
rate-matching, puncturing, or power scaling one or more of the symbols within the uplink transmission,
modifying at least one of a modulation and coding scheme (MCS) or a power associated with a downlink transmission to the UE, or
a combination thereof; and
transmit, to a base station, the uplink transmission based at least in part on adjusting the transmission parameter, wherein the uplink transmission includes at least one first symbol associated with a full duplex mode of the UE and at least one second symbol associated with a half duplex mode of the UE.

2. The UE of claim 1, wherein the uplink transmission includes a message on a physical uplink shared channel, a physical uplink control channel, a random access channel, or a sounding reference signal resource.

3. The UE of claim 1, wherein the transmission parameter is adjusted based at least in part on a setting stored in the memory.

4. The UE of claim 1, wherein the transmission parameter is adjusted based at least in part on receiving a message from the base station.

5. The UE of claim 4, wherein the message includes a configuration for rate-matching or puncturing at least one symbol in the uplink transmission.

6. The UE of claim 1, wherein the transmission parameter is adjusted by rate-matching or puncturing all symbols within the uplink transmission.

7. The UE of claim 1, wherein rate-matching or puncturing is not performed for any symbols within the uplink transmission.

8. The UE of claim 1, wherein the transmission parameter is adjusted by rate-matching at least one symbol within symbols scheduled by the base station for the uplink transmission, and wherein rate-matching the at least one symbol comprises not mapping the uplink transmission to the at least one symbol when the at least one symbol overlaps with a reference signal from the base station.

9. The UE of claim 1, wherein the transmission parameter is adjusted by power scaling at least one symbol within the uplink transmission.

10. The UE of claim 9, wherein power scaling the at least one symbol within the uplink transmission comprises increasing a power associated with the at least one symbol.

11. The UE of claim 9, wherein power scaling the at least one symbol within the uplink transmission comprises decreasing a power associated with the at least one symbol.

12. The UE of claim 1, wherein the uplink transmission is associated with the full duplex mode of the UE.

13. The UE of claim 12, wherein the UE, when in the full duplex mode, transmits and receives, in a same frequency bandwidth, concurrently.

14. The UE of claim 12, wherein the UE, when in the full duplex mode, transmits a first set of symbols and receives a second set of symbols, in a same frequency bandwidth, wherein the first set of symbols and the second set of symbols are separated in time by less than a threshold.

15. The UE of claim 12, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

16. The UE of claim 1, wherein the transmission parameter is adjusted such that a transmit power associated with the at least one first symbol is equal to a transmit power associated with the at least one second symbol.

17. A base station for wireless communication, comprising:
a memory; and
one or more processors coupled to the memory, the memory and the one or more processors configured to:
transmit, to a user equipment (UE), a message that triggers the UE to adjust a transmission parameter associated with an uplink transmission from the UE, wherein a phase of the uplink transmission is continuous across symbols of the uplink transmission, wherein adjusting the transmission parameter includes at least one of:
rate-matching, puncturing, or power scaling one or more of the symbols within the uplink transmission,
modifying at least one of a modulation and coding scheme (MCS) or a power associated with a downlink transmission to the UE, or
a combination thereof; and
receive, from the UE, the uplink transmission based at least in part on transmitting the message, wherein the uplink transmission includes at least one first symbol associated with a full duplex mode of the UE and at least one second symbol associated with a half duplex mode of the UE.

18. The base station of claim 17, wherein the message includes a configuration for rate-matching or puncturing at least one symbol in the uplink transmission.

19. The base station of claim 17, wherein all symbols within the uplink transmission are rate-matched or punctured.

20. The base station of claim 17, wherein no symbols within the uplink transmission are rate-matched or punctured.

21. The base station of claim 17, wherein at least one symbol within the uplink transmission is power scaled.

22. A method of wireless communication performed by a user equipment (UE), comprising:
adjusting a transmission parameter associated with an uplink transmission from the UE, wherein a phase for the uplink transmission is continuous across symbols of the uplink transmission, wherein adjusting the transmission parameter includes at least one of:
rate-matching, puncturing, or power scaling one or more of the symbols within the uplink transmission,
modifying at least one of a modulation and coding scheme (MCS) or a power associated with a downlink transmission to the UE, or
a combination thereof; and
transmitting, to a base station, the uplink transmission based at least in part on adjusting the transmission parameter, wherein the uplink transmission includes at least one first symbol associated with a full duplex mode of the UE and at least one second symbol associated with a half duplex mode of the UE.

23. The method of claim 22, wherein the uplink transmission includes a message on a physical uplink shared channel, a physical uplink control channel, a random access channel, or a sounding reference signal resource.

24. The method of claim 22, wherein the transmission parameter is adjusted based at least in part on a setting stored in a memory of the UE.

25. The method of claim 22, wherein the transmission parameter is adjusted based at least in part on receiving a message from the base station.

26. The method of claim 25, wherein the message includes a configuration for rate-matching or puncturing at least one symbol in the uplink transmission.

27. The method of claim 22, wherein the transmission parameter is adjusted by rate-matching or puncturing all symbols within the uplink transmission.

28. The method of claim 22, wherein rate-matching or puncturing is not performed for any symbols within the uplink transmission.

29. A method of wireless communication performed by a base station, comprising:
transmitting, to a user equipment (UE), a message that triggers the UE to adjust a transmission parameter associated with an uplink transmission from the UE, wherein a phase of the uplink transmission is continuous across symbols of the uplink transmission, wherein adjusting the transmission parameter includes at least one of:
rate-matching, puncturing, or power scaling one or more of the symbols within the uplink transmission,
modifying at least one of a modulation and coding scheme (MCS) or a power associated with a downlink transmission to the UE, or
a combination thereof; and
receiving, from the UE, the uplink transmission based at least in part on transmitting the message, wherein the uplink transmission includes at least one first symbol associated with a full duplex mode of the UE and at least one second symbol associated with a half duplex mode of the UE.

* * * * *